United States Patent
Shimazu et al.

(10) Patent No.: US 11,521,117 B2
(45) Date of Patent: Dec. 6, 2022

(54) CONTROL DATA CREATION DEVICE, COMPONENT CONTROL DEVICE, CONTROL DATA CREATION METHOD, COMPONENT CONTROL METHOD AND COMPUTER PROGRAM

(71) Applicant: Shimano Inc., Osaka (JP)

(72) Inventors: Hayato Shimazu, Osaka (JP); Hitoshi Takayama, Osaka (JP); Satoshi Shahana, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 316 days.

(21) Appl. No.: 16/453,319

(22) Filed: Jun. 26, 2019

(65) Prior Publication Data

US 2020/0012964 A1 Jan. 9, 2020

(30) Foreign Application Priority Data

Jul. 9, 2018 (JP) .............................. JP2018-130244

(51) Int. Cl.
*G06N 20/00* (2019.01)
*G06V 20/40* (2022.01)
(Continued)

(52) U.S. Cl.
CPC .............. *G06N 20/00* (2019.01); *G06V 20/40* (2022.01); *G06V 20/56* (2022.01); *G06V 30/194* (2022.01)

(58) Field of Classification Search
CPC ............... G06N 20/00; G06K 9/00711; G06K 9/00791; G06K 9/66
See application file for complete search history.

(56) References Cited

U.S. PATENT DOCUMENTS 6,047,230 A * 4/2000 Spencer ......................... 701/57
9,975,603 B2 5/2018 Bortolozzo et al.

FOREIGN PATENT DOCUMENTS

EP 2 871 082 B1 5/2018
JP 2007-272361 A 10/2007

OTHER PUBLICATIONS

Lin, S. et al, Design of an automatic shift control system with self-learning ability fora bicycle [online], 2015 [retrieved Jul. 1, 2021]. Retrieved from Internet:<https://www.tandfonline.com/doi/abs/10.1080/02533839.2015.1010451 > (Year: 2015).*

(Continued)

*Primary Examiner* — Miranda M Huang
*Assistant Examiner* — Bart I Rylander
(74) *Attorney, Agent, or Firm* — Global IP Counselors, LLP

(57) ABSTRACT

A control data creation device is provided that has an acquisition part, a creation part and an evaluation part. The acquisition part acquires input information concerning traveling of a human-powered vehicle. The creation part creates by a learning algorithm a learning model that outputs output information concerning control of a component of the human-powered vehicle based on input information acquired by the acquisition part. The evaluation part evaluates output information output from the learning model. The creation part updates the learning model based on training data including an evaluation by the evaluation part, input information corresponding to an output of the output information and the output information.

14 Claims, 12 Drawing Sheets

(51) Int. Cl.
   *G06V 20/56* (2022.01)
   *G06V 30/194* (2022.01)

(56) References Cited

OTHER PUBLICATIONS

Vanwalleghem, J. et al, Sensor design for outdoor racing bicycle field testing for human vibration comfort evaluation [online], 2013 [retrieved Jul. 2, 2021]. Retrieved from Internet:<https://iopscience.iop.org/article/10.1088/0957-0233/24/9/095002/pdf> (Year: 2013).*
Zhang, Y. et al, Rider Trunk and Bicycle Pose Estimation With Fusion of Force/Inertial Sensors [online], 2013 [retrieved Jul. 2, 2021], Retrieved from Internet:<https://ieeexplore.ieee.org/stamp/stamp.jsp?tp=&arnumber=6509436> (Year: 2013).*
Lin, S. et al, Design of an automatic shift control system with self-learning ability for a bicycle, [retrieved Jul. 1, 2021]. Retrieved from Internet:<https://www.tandfonline.com/doi/abs/10.1080/02533839.2015.1010451> (Year: 2015).*
Vanwalleghem, J. et al, Sensor design for outdoor racing bicycle field testing for human vibration comfort evaluation, [retrieved Jul. 2, 2021], Retrieved from Internet:<https://iopscience.iop.org/article/10.1088/0957-0233/24/9/095002/pdf> (Year: 2013).*
Zhang, Y. et al, Rider Trunk and Bicycle Pose Estimation With Fusion of Force/Inertial Sensors, [retrieved Jul. 2, 2021], Retrieved from Internet:<https://ieeexplore.ieee.org/stamp/stamp.jsp?tp=&arnumber=6509436> (Year: 2013).*
Tandon, P. et al, Design and Simulation of an Intelligent Bicycle Transmission System, [retrieved May 2, 2022], Retrieved from Internet: <https://ieeexplore.ieee.org/abstract/document/5443749/> (Year: 2010).*

\* cited by examiner

CONTROL DATA CREATION DEVICE, COMPONENT CONTROL DEVICE, CONTROL DATA CREATION METHOD, COMPONENT CONTROL METHOD AND COMPUTER PROGRAM

CROSS-REFERENCE TO RELATED APPLICATIONS

This application claims priority to Japanese Patent Application No. 2018-130244, filed on Jul. 9, 2018. The entire disclosure of Japanese Patent Application No. 2018-130244 is hereby incorporated herein by reference.

BACKGROUND

Technical Field

The present invention generally relates to a control data creation device for creating data concerning control of the components of a human-powered vehicle, a component control device, a control data creation method, a component control method and a computer program.

Background Information

Human-powered vehicles at least partially utilizing man power have been known, including a bicycle, a power-assisted bicycle, an electric bicycle called an e-bike and so on. The human-powered vehicle is provided with a multi-geared transmission device that shifts gears according to a gear shifting operation by a rider. An automatic gear shifting control system has conventionally been proposed for automatically controlling a gear shift by using sensors such as a speed sensor, a cadence sensor, a chain tension sensor and so on, and performing various computations on an output from each of the sensors (e.g., see U.S. Pat. No. 6,047,230—Patent Document 1).

SUMMARY

An automatic gear shifting control aims at producing a gear shift that closely matches a rider's intention. The automatic control of components, including the transmission disclosed in Patent Document 1 or the like, is achieved by combinations of determinations on whether or not each of numerical values obtained from the various sensors such as a speed sensor, a torque sensor and so on mounted on the human-powered vehicle is larger than a predetermined threshold. However, determination using a threshold is insufficient for achieving desired automatic control.

An object of the present disclosure is to provide a control data creation device that achieves automatic control of components that is less likely to make the rider feel uncomfortable, a component control device, a control data creation method, a component control method and a computer program.

A control data creation device according to a first aspect of the present disclosure comprises a non-transitory computer readable storage and at least one processor. The non-transitory computer readable storage has a learning algorithm stored in the non-transitory computer readable storage. The at least one processor is operatively coupled to the non-transitory computer readable storage to execute operations. The at least one processor includes an acquisition part and a creation part. The acquisition part is configured to acquire input information concerning traveling of a human-powered vehicle. The creation part is configured to use the learning algorithm to create a learning model that outputs output information concerning control of a component of the human-powered vehicle based on the input information acquired by the acquisition part. The evaluation part is configured to evaluate the output information output from the learning model. The creation part is configured to update the learning model based on training data including an evaluation by the evaluation part, the input information corresponding to an output of the output information, and the output information.

This makes it possible to better optimize component control depending on the situations where determination using a threshold is insufficient, based on multiple pieces of input information including measured values concerning traveling and to achieve control that is less likely to make the rider feel uncomfortable.

In a control data creation device according to a second aspect of the present disclosure, in the control data creation device according to the above-described first aspect is configured such that the evaluation part is configured to determine whether or not control of a component based on the output information output from the learning model is performed in a predetermined manner and increases an evaluation if it is determined that the control is smoothly performed.

Hence, the component control is optimized so as to be smoothly performed. This makes it possible to achieve control that is less likely to make the rider feel uncomfortable.

In a control data creation device according to a third aspect of the present disclosure, the control data creation device according to the above-described second aspect is configured such that the evaluation part is configured to detect a torque applied to a driving mechanism of the human-powered vehicle upon determining the control based on output information is performed, and the evaluation part is configured to determine whether or not the control is performed in the predetermined manner depending on the torque.

This makes it possible to achieve control that is less likely to make the rider feel uncomfortable.

In a control data creation device according to a fourth aspect of the present disclosure, the control data creation device according to the above-described second aspect is configured such that the evaluation part is configured to detect a torque applied to a driving mechanism of the human-powered vehicle upon determining the control based on output information is performed, and the evaluation part is configured to determine whether or not the control is performed in the predetermined manner depending on a variation of the torque.

This makes it possible to achieve control that is less likely to make the rider feel uncomfortable.

In a control data creation device according to a fifth aspect of the present disclosure, the control data creation device according to the above-described second aspect is configured such that the evaluation part detects an attitude of the human-powered vehicle upon determining the control based on output information is performed, and the evaluation part is configured to determine whether or not the control is performed in the predetermined manner depending on the attitude of the human-powered vehicle.

This makes it possible to achieve control that is less likely to make the rider feel uncomfortable.

In a control data creation device according to a sixth aspect of the present disclosure, the control data creation device according to the above-described second aspect is configured such that the evaluation part is configured to detect a vibration of the human-powered vehicle upon determining the control based on output information is performed, and the evaluation part is configured to determine whether or not the control is performed in the predetermined manner depending on the vibration.

This makes it possible to achieve control that is less likely to make the rider feel uncomfortable.

In a control data creation device according to a seventh aspect of the present disclosure, the control data creation device according to the above-described second aspect is configured such that the evaluation part is configured to measure a chain tension of the human-powered vehicle upon determining the control based on output information is performed, and the evaluation part is configured to determine whether or not the control is performed in the predetermined manner depending on the chain tension.

This makes it possible to achieve control that is less likely to make the rider feel uncomfortable.

In a control data creation device according to an eighth aspect of the present disclosure, the control data creation device according to the above-described second aspect is configured such that the evaluation part is configured to detect a posture of a user of the human-powered vehicle upon determining control based on output information is performed, and the evaluation part is configured to determine whether or not the control is performed in the predetermined manner depending on the posture of the user.

This makes it possible to achieve control that is less likely to make the rider feel uncomfortable.

In a control data creation device according to a ninth aspect of the present disclosure, the control data creation device according to any one of the above-described first to eighth aspects is configured such that the creation part is configured to update the learning model by assigning a larger weight as a degree of evaluation by the evaluation part is higher or lower.

This makes it possible to achieve control that is less likely to make the rider feel uncomfortable.

In a control data creation device according to a tenth aspect of the present disclosure, the control data creation device according to any one of the above-described first to ninth aspects further comprises a user operable input device and a non-transitory computer readable storage. The user operable input device is configured to accept a designation operation concerning the output information. The non-transitory computer readable storage temporarily stores, one by one, a plurality of pieces of input information in time series for access by the acquisition part. Upon determining acceptance of the designation operation by the user operable input device, the creation part is configured to set the pieces of the input information acquired before and after the designation operation is performed as input data, and the creation part is configured to update the learning model by the input data and a detail of the operation performed by the user operable input device.

This makes it possible to achieve automatic control suited to the operation by the rider.

A component control device according to an eleventh aspect of the present disclosure comprises a non-transitory computer readable storage and at least one processor. The non-transitory computer readable storage has a learning algorithm stored in the non-transitory computer readable storage. The at least one processor is operatively coupled to the non-transitory computer readable storage to execute operations including an acquisition part, a creation part, a control part and an evaluation part. The acquisition part is configured to acquire input information concerning traveling of the human-powered vehicle. The creation part configured to use the learning algorithm to create a learning model such that the input information concerning traveling of a human-powered vehicle is set as an input and output information concerning control of a component of the human-powered vehicle is to be output. The control part is configured to control the component based on the output information output in response to an input of the input information acquired by the acquisition part to the learning model. The evaluation part evaluates a detail of control by the control part. The learning model is updated based on an evaluation by the evaluation part, the input information corresponding to the evaluation, and a detail of control as an object to be evaluated.

This makes it possible to better optimize component control depending on the situations where determination using a threshold is insufficient, based on multiple pieces of input information including measured values concerning traveling and to achieve control that is less likely to make the rider feel uncomfortable.

In a component control device according to a twelfth aspect of the present disclosure, the component control device according to the eleventh aspect further comprises an evaluation acceptance part configured to accept an evaluation of a detail of control performed by the control part, and upon acceptance of an evaluation by the evaluation acceptance part, the learning model being updated based on training data including a plurality of pieces of input information acquired before and after a timing when the evaluation is accepted, the detail of the control and the evaluation accepted by the evaluation acceptance part.

This makes it possible to achieve automatic control suited to the preferences of the rider.

A control data creation method according to a thirteenth aspect of the present disclosure comprises acquiring input information concerning traveling of a human-powered vehicle; creating a learning model using a learning algorithm such that the input information that was acquired is set as an input, and output information concerning control of a component of the human-powered vehicle is to be output; and evaluating the output information output from the learning model. The learning model is updated based on training data including an evaluation, the input information corresponding to an output of the output information, and the output information as an object to be evaluated.

This makes it possible to better optimize component control depending on the situations where determination using a threshold is insufficient, based on multiple pieces of input information including measured values concerning traveling and to achieve control that is less likely to make the rider feel uncomfortable.

A component control method according to a fourteenth aspect of the present disclosure comprises: acquiring input information concerning traveling of a human-powered vehicle; specifying output information output in response to an input of the input information to a learning model that is created using a learning algorithm such that the input information that was acquired is set as an input and output information concerning control of a component of the human-powered vehicle is to be output; controlling the component based on the output information that was specified; evaluating a detail of the control; and updating the learning model based on training data including an evaluation, the input information corresponding to the evaluation, and a detail of control as an object to be evaluated.

This makes it possible to better optimize component control depending on the situations where determination using a threshold is insufficient, based on multiple pieces of input information including measured values concerning traveling and to achieve control that is less likely to make the rider feel uncomfortable.

A computer program product according to a fifteenth aspect of the present disclosure is disposed upon a non-transitory computer readable storage medium. The computer program product comprises computer program instructions that, when executed by a computer, cause the computer to execute processing of acquiring input information concerning traveling of a human-powered vehicle; creating a learning model using a learning algorithm such that the input information that was acquired is set as an input and output information concerning control of a component of the human-powered vehicle is to be output; and evaluating output information output from the learning model. The learning model is updated based on training data including an evaluation, the input information corresponding to an output of the output information, and the output information as an object to be evaluated.

This makes it possible to more optimize component control depending on the situations where determination using a threshold is insufficient, based on multiple pieces of input information including the measured values concerning traveling and to achieve control that is less likely to make the rider feel uncomfortable.

According to the control data creation device for creating control data concerning control of the components of a human-powered vehicle, the component control device, the creation method, the component control method and the computer program, automatic control of the components that is less likely to make the rider feel uncomfortable is achieved.

BRIEF DESCRIPTION OF THE DRAWINGS

Referring now to the attached drawings which form a part of this original disclosure.

DETAILED DESCRIPTION OF EMBODIMENT

The descriptions of the embodiments below are examples of forms that a control data creation device and a component control device according to the present invention can take, though there is no intention to limit the forms. The control data creation device, the component control device, a creation method, a component control method, a computer program and a learning model according to the present invention can take forms different from the embodiments, such as forms of modification of each of the embodiments and a combination of at least two or more modifications that do not contradict each other. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

In the following description of each of the embodiments, the terms indicating directions, such as front, rear, forward, backward, left, right, sideways, upper, lower and so on are used with reference to the directions seen as the user sits in the saddle of a human-powered vehicle.

First Embodiment

Figure 1:
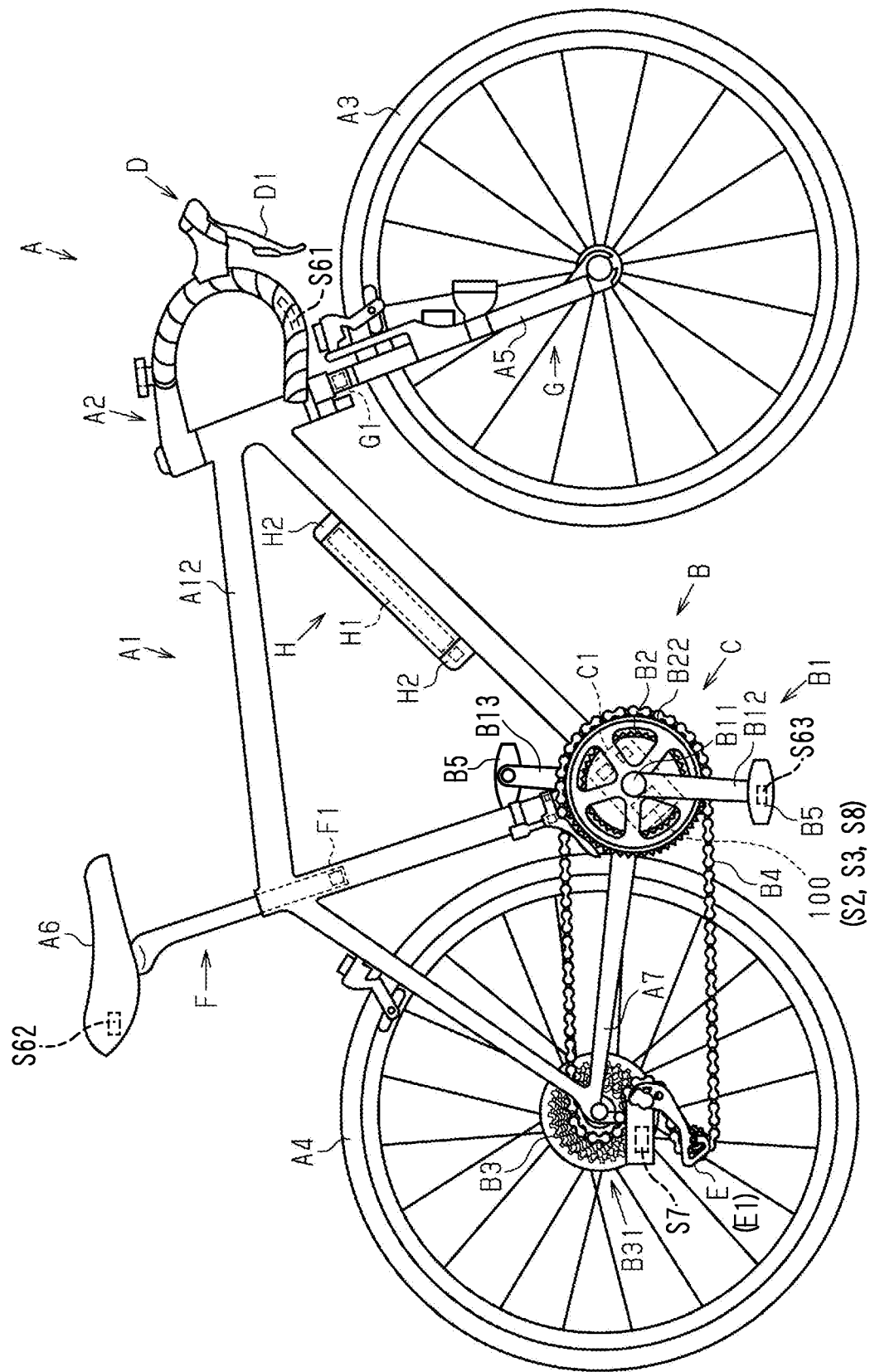
FIG. 1 is a side elevational view of a bicycle to which control data creation devices or component control devices are applied according to first to third embodiments.

FIG. 1 is a side view of a human-powered vehicle A to which a control data creation device 1 according to the first embodiment is applied. The human-powered vehicle A is a road bike including an assist mechanism C that assists in the propulsion of the human-powered vehicle A using electric energy. The configuration of the human-powered vehicle A can arbitrarily be changed. In the first example, the human-powered vehicle A does not include the assist mechanism C. In the second example, the kind of the human-powered vehicle A is a utility bicycle, a mountain bicycle or a hybrid bicycle. In the third example, the human-powered vehicle A includes the features of the first example and the second example.

The human-powered vehicle A is provided with a main body A1, a handlebar A2, a front wheel A3, a rear wheel A4, a front fork A5, a saddle A6 and a derailleur hanger A7. The human-powered vehicle A includes a driving mechanism B, an assist mechanism C, a plurality of user operable input devices D (only one shown in FIG. 1), a transmission E, an electric seat post F, an electric suspension G, a battery unit H and a controller 100. The human-powered vehicle A includes a speed sensor S1, a cadence sensor S2, a torque sensor S3, a gyro sensor S4, an image sensor S5 and posture sensors S61, S62 and S63. The main body A1 is provided with a frame A12.

The driving mechanism B transmits a human-powered drive force to the rear wheel A4 by a chain drive, a belt drive or a shaft drive. FIG. 1 illustrates the driving mechanism B by the chain drive. The driving mechanism B includes a crank B1, a first sprocket assembly B2, a second sprocket assembly B3, a chain B4 and a pair of pedals B5.

The crank B1 includes a crank shaft B11, a right crank B12 and a left crank B13. The crank shaft B11 is rotatably supported to the assist mechanism C mounted on the frame A12. The right crank B12 and the left crank B13 are respectively coupled to the crank shaft B11. One of the pair of pedals B5 is rotatably supported to the right crank B12. The other of the pair of pedals B5 is rotatably supported to the left crank B13.

The first sprocket assembly B2 has a first rotative central axis and is coupled to the crank shaft B11 so as to allow for unitary rotation. The first sprocket assembly B2 includes one or more sprockets B22. The crank shaft B11 and the first sprocket assembly B2 are coaxial with each other. As one example, the first sprocket assembly B2 includes multiple sprockets B22 different in outer diameters. As one example, the multiple sprockets B22 are made larger in outer diameter and larger in the number of gear stages as they are outwardly away from the main body A1.

The second sprocket assembly B3 has a second rotative central axis and is rotatably supported to a hub (not illustrated) of the rear wheel A4. The second sprocket assembly B3 includes one or more sprockets B31. As one example, the second sprocket assembly B3 includes multiple sprockets B31 different in outer diameters. As one example, the multiple sprockets B31 are made smaller in outer diameter and larger in the number of gear stages as they are outwardly away from the rear wheel A4.

The chain B4 is entrained about any one of the sprockets B22 of the first sprocket assembly B2 and any one of the sprockets B31 of the second sprocket assembly B3. When the crank B1 rotates forwardly by a human-powered drive force applied to the pair of pedals B5, the first sprocket assembly B2 rotates forwardly together with the crank B1, which transmits the rotation of the first sprocket assembly B2 to the second sprocket assembly B3 via the chain B4 to thereby rotate forwardly the rear wheel A4.

The assist mechanism C includes an electric actuator C1. The assist mechanism C assists the propulsion of the human-powered vehicle A. As one example, the assist mechanism C transmits a torque to the first sprocket assembly B2 to thereby assist the propulsion of the human-powered vehicle A. The electric actuator C1 includes an electric motor, for example. The electric actuator C1 can include a reducer. The electric actuator C1 includes the chain B4 that runs for transmitting a driving force to the rear wheel A4 of the human-powered vehicle A. The assist mechanism C is a part of the components that can be controlled by a signal for assisting the running of the chain B4.

Each of the user operable input devices D includes a user operated part D1 to be operated by the user. The user operable input device D is not limited to the one illustrated FIG. 1, and can include, for example, a button, a switch, a lever, a dial and/or a touch screen. One example of the user operated part D1 is one or more buttons for operating the electric seat post F and the electric suspension G. Another example of the user operated part D1 is a dual brake-shift lever as shown in FIG. 1 for operating a brake device and the transmission E. The dual brake-shift levers are provided at left and right ends of the handlebar A2. The dual brake-shift levers are moved to be inclined sideways, such that a gear stage or a gear ratio for the transmission E can be changed.

In addition, the user operable input devices D accept a designation operation concerning control of various components such as mode switching of the assist mechanism C (power-saving mode, high-power mode, etc.), operation switching of the electric seat post F, operation switching of the electric suspension G and so on. The user operable input devices D are connected to communicate with each of the components so as to transmit a signal according to an operation performed on the user operated part D1 to the transmission E or the other components. In the first example, one of the user operable input devices D is connected to communicate with the transmission E through a communication line or an electric wire that allows for power line communication (PLC). In the second example, one of the user operable input devices D is connected to communicate with the transmission E and the other components by a wireless communication unit that allows for wireless communication. In the case where the user operated part D1 is operated, a control signal for shifting the gear stage of the transmission E is transmitted to the transmission E, and in response to the signal, the transmission E operates to shift the gear stage in the first example. The control signal includes, for example, an INWARD signal indicating a shift to the inner sprocket B31 and an OUTWARD signal indicating a shift to the external sprocket B31, for example. Each of the signals can include the gear stage of the sprocket B31 to be shifted. Shifting of two stages or more at a time can also be possible.

The transmission E can take various forms. In the first example, the transmission E is an external transmission for shifting a coupled state between the second sprocket assembly B3 and the chain B4. Specifically, by shifting the sprocket B31 to be coupled to the chain B4, the transmission E changes the ratio of the number of rotations of the rear wheel A4 to the number of rotations of the crank B1, that is, the gear ratio of the human-powered vehicle A. The transmission E activates the electric actuator E1 to move the chain B4 according to the selected gear stage to thereby change the gear ratio. More specifically, the transmission E in the first example is attached to the derailleur hanger A7 of the human-powered vehicle A. In the second example, the transmission E is an external transmission for shifting a coupled state between the first sprocket assembly B2 and the chain B4. Specifically, by shifting the sprocket B22 to be coupled to the chain B4, the transmission E changes the ratio of the number of rotations of the rear wheel A4 to the number of rotations of the crank B1, that is, the gear ratio of the human-powered vehicle A. In the third example, the transmission E is an internal transmission. In the third example, the movable part of the transmission E includes at least one of a sleeve and a claw of the internal transmission. In the fourth example, the transmission E is a continuously variable transmission. In the fourth example, the movable part of the transmission E includes a ball planetary of the continuously variable transmission. The transmission E is a part of the components that can be controlled by a signal for shifting a gear stage.

The electric seat post F is attached to the frame A12. The electric seat post F includes an electric actuator F1. The electric actuator F1 causes the saddle A6 to rise or fall relative to the frame A12. The electric actuator F1 is an electric motor, for example. The electric seat post F is a part of the components that can be controlled by setting a supported position of the saddle A6 relative to the frame A12 as an operation parameter. The saddle A6 can be supported at one or more supported positions.

The electric suspension G can take various forms. In the first embodiment, the electric suspension G, which is provided at the front fork A5, is a front suspension for damping the shock applied to the front wheel A3. The electric suspension G includes an electric actuator G1. The electric actuator G1 is an electric motor, for example. The electric suspension G is a part of the components that can be controlled by setting a damping factor, a stroke amount and a locked out state as operation parameters. The electric suspension G can change the operation parameters by driving the electric actuator G1. The electric suspension G can be a rear suspension for damping the shock applied to the rear wheel A4.

The battery unit H includes a battery H1 and a battery holder H2. The battery H1 is a rechargeable battery including one or more battery cells. The battery holder H2 is fixed at the frame A12 of the human-powered vehicle A. The battery H1 can be attached to and detached from the battery holder H2. When attached to the battery holder H2, the battery H1 is electrically connected to at least the electric actuator E1 of the transmission E, the electric actuator C1 of the assist mechanism C and the controller 100. The battery H1 can also be electrically connected to the electric actuator F1 of the electric seat post F and the electric actuator G1 of the electric suspension G.

The speed sensor S1 is fixed at the frame A12. The speed sensor S1 is a sensor for outputting a signal indicating the traveling speed of the human-powered vehicle A. The speed sensor S1, which includes a magnet provided at the front wheel A3 and a main body provided at the front fork A5 for detecting the magnet, for example, measures a rotation speed.

The cadence sensor S2 is provided so as to measure a cadence of any one of the right crank B12 and the left crank B13. The cadence sensor S2 outputs a signal indicating the measured cadence. The torque sensor S3 is provided so as to respectively measure torques applied to the right crank B12 and the left crank B13. The torque sensor S3 outputs a signal indicating the torque measured at least one of the right crank B12 and the left crank B13.

The gyro sensor S4 is fixed at the frame A12. The gyro sensor S4 is a sensor for outputting signals respectively indicating yaw, roll and pitch of the human-powered vehicle A. The gyro sensor S4 can output a signal indicating at least any one of the three axes, not limited to all the three axes.

The image sensor S5 is provided on the frame A12 so as to face the front. In the first example, the image sensor S5 is mounted on the front fork A5 together with a light so as to face the front. In the second example, it is mounted on the handlebar A2. The image sensor S5 outputs a video corresponding to the user's field of vision by using a camera module. The image sensor S5 outputs a video signal obtained by photographing an object present in the direction of travel. The image sensor S5 can be a module that is integrally equipped with an image recognition unit for performing recognition processing of separately recognizing a road, a building and another traveling vehicle from the video and that outputs a recognition result.

The posture sensors S61, S62 and S63 are piezoelectric sensors, for example. The posture sensors S61, S62 and S63 are provided at each of the portions of the human-powered vehicle A where the weight of the user is applied. The posture sensors S61 are provided at both of the handles, for example. The posture sensors S62 are provided at one or more positions of the saddle A6 along the surface thereof. The posture sensors S63 are provided at both of the pair of pedals B5 of the crank B1. The posture sensors S61, S62 and S63 each output a signal responsive to the applied weight. In place of the posture sensors S61, S62 and S63 or in addition thereto, a gyro sensor can be attached to the helmet in order to detect the posture of the user.

A vibration sensor S7 is provided close to the transmission E. The vibration sensor S7 is mounted on, for example, the second sprocket assembly B3. The vibration sensor S7 directly or indirectly detects at least one of the vibrations of the main body A1, the second sprocket assembly B3 and the chain B4, and the vibration of the transmission E itself obtained when a gear stage or a gear ratio is changed. The vibration detection can take various forms. In the first example, a sensor for detecting the vibration of air is included. More specifically, the vibration sensor S7 includes a microphone and outputs a sound signal of the collected sound. In this case, the vibration sensor S7 indirectly detects through air at least one of a vibration of the main body A1 to which the transmission E is attached, a vibration of the second sprocket assembly B3, a vibration of the chain B4 entrained about the second sprocket assembly B3 and a vibration of the transmission E. In the second example, the vibration sensor S7 is an acceleration sensor or a gyro sensor, and directly detects a vibration to output a signal indicating the vibration. The vibration sensor S7 can include at least one of the microphone, the acceleration sensor and the gyro sensor or include all of them.

A tension sensor S8 detects a tension applied to the chain B4. In the first example, a strain sensor provided at a position where the crank shaft B11 of the bottom bracket hanger of the main body A1 is attached is used. By the output from the strain sensor, a reaction force of the chain tension occurring at the bearing of the crank shaft B11 can be measured. The tension sensor S8 can be mounted on the sprocket B22 about which the chain B4 of the first sprocket assembly B2 is entrained so as to directly measure the tension.

Figure 2:
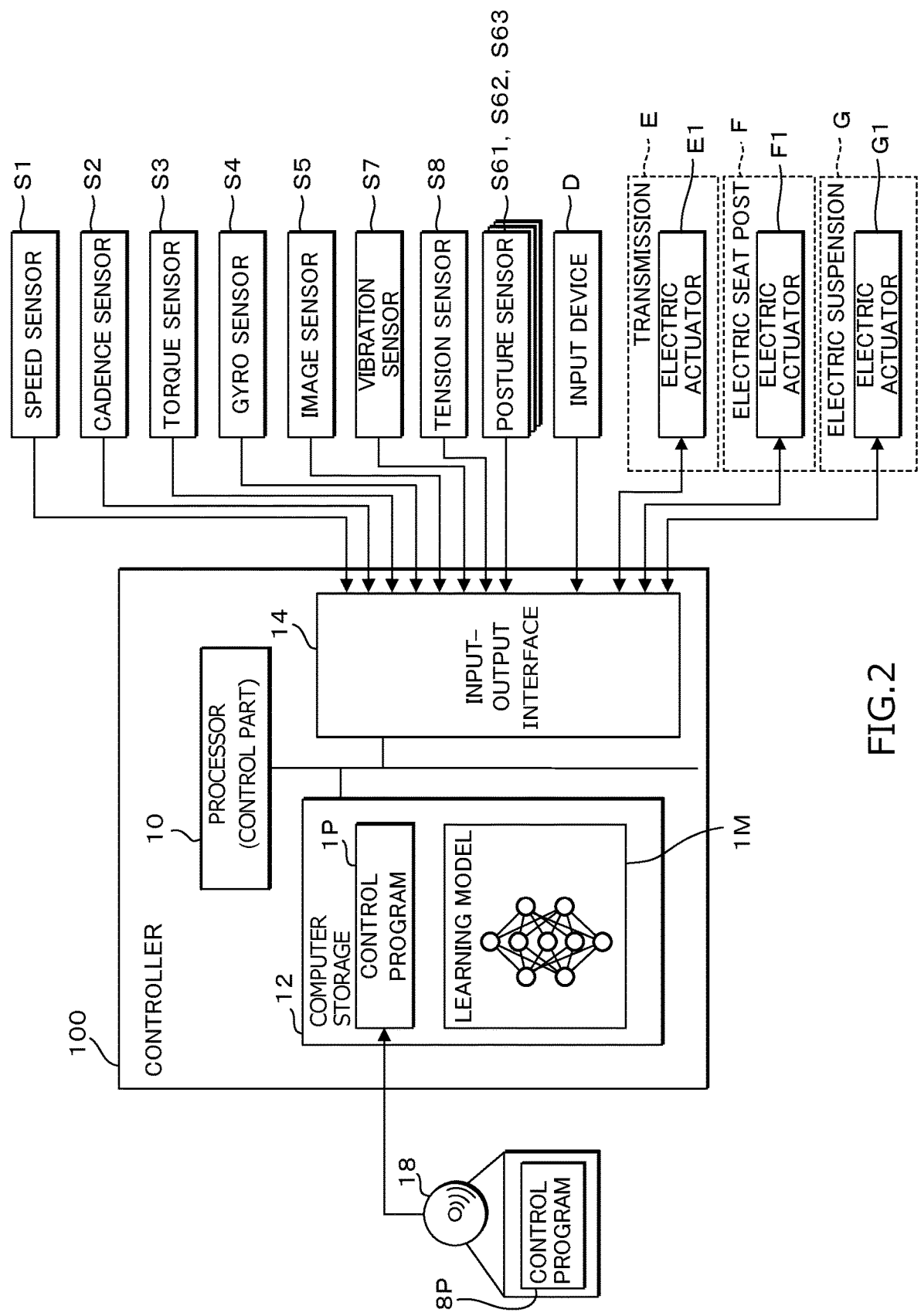
FIG. 2 is a block diagram schematically illustrating a bicycle component control system and schematically illustrating an internal configuration of a controller.

FIG. 2 is a block diagram illustrating the internal configuration of the controller 100. The controller 100 is preferably an electronic controller or a microcomputer that includes one or more processors and one or more computer storage devices (i.e., computer memory devices). The controller 100 is formed of one or more semiconductor chips that are mounted on a printed circuit board. The terms "controller" and "electronic controller" as used herein refer to hardware that executes a software program, and does not include a human. The controller 100 includes a processor 10, a storage 12 and an input-output interface 14. The controller 100 is provided at any position of the frame A12. In the first example as illustrated in FIG. 1, the controller 100 is provided between the first sprocket assembly B2 and the frame A12. In the second example, the controller 100 is provided in the battery holder H2.

The processor 10 is a computer processor utilizing a central processing unit (CPU) or a graphics processing unit (GPU), and executes processing by controlling a learning algorithm described later and the components provided in the human-powered vehicle A using a memory such as a built-in read only memory (ROM), a random access memory (RAM) and so on. The processor 10 acquires time information at an arbitrary timing by using an internal clock.

The storage 12 is any computer storage device or any non-transitory computer-readable medium with the sole exception of a transitory, propagating signal. In other words, the term "storage" as used herein refers to a non-transitory computer readable storage. The storage 12 includes a non-volatile memory such as a flash memory, a hard disk, a ROM (Read Only Memory) device, and so on, for example. Also, for example, the storage 12 can also include volatile memory such as a RAM (Random Access Memory) device. The storage 12 stores a control program 1P. The storage 12 stores a learning model 1M created by the processing performed by the processor 10. The control program 1P can be obtained by reading out a control program 8P stored in a recording medium 18 and copying it in the storage 12.

The input-output interface 14 is connected to at least sensor groups S1-S5 and S61-S63, S7 and S8, the user operable input devices D and the electric actuator E1 to be controlled that are mounted on the human-powered vehicle A. The input-output interface 14 is also connected to the electric actuators F1 and G1 to be controlled. The processor 10 receives an input of a signal indicative of speed or a cadence from any one of the speed sensor S1 or the cadence sensor S2 through the input-output interface 14. The processor 10 receives an input of a signal indicative of an attitude of the human-powered vehicle A, specifically, a signal indicative of yaw, roll or pitch from the gyro sensor S4. The processor 10 receives an input of a signal indicative of a posture of the user, specifically, a signal indicative of weight distribution from the posture sensors S61, S62 and S63. The processor 10 performs processing utilizing the information acquired from these sensor groups S1-S5, S61-S63, S7 and S8 as input information. The processor 10 receives a signal from the user operable input devices D through the input-output interface 14. In the block diagram illustrated in FIG. 2, the input-output interface 14 is connected to the electric actuator F1 and the electric actuator G1, though it does not need to be connected to the electric actuator F1 and the electric actuator G1 if these actuators F1 and G1 are not to be controlled.

The processor 10 of the controller 100 functions as a control part that controls components including the transmission E according to the control program 1P based on output information output from the learning model 1M in response to an input of the input information acquired through the input-output interface 14 to the learning model 1M. The controller 100 functions as a creation part that updates the learning model 1M based on the control program 1P. The processor 10 of the controller 100 corresponds to a "control data creation device" and a "component control device."

Figure 3:
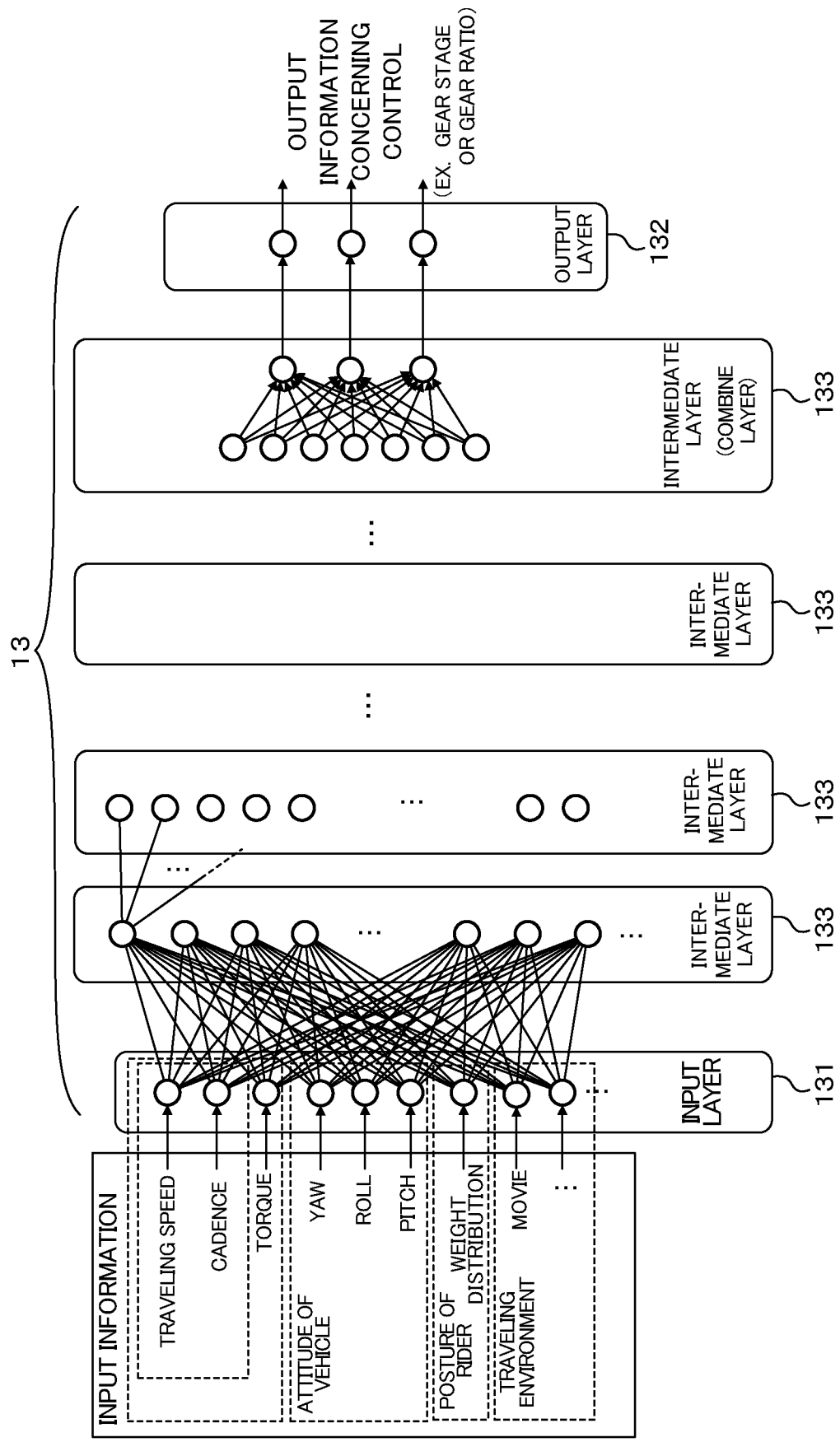
FIG. 3 illustrates one example of a learning model to be created by the processor of the controller using a learning algorithm.

FIG. 3 illustrates one example of the learning model 1M to be created. The learning model 1M is formed by a neural network 13 including an input layer 131 to which multiple pieces of input information obtained by the sensor groups S1-S5 and S61-S63 are input and an output layer 132 from which control data is output. The learning algorithm can be an unsupervised learning algorithm, or can be a recurrent neural network. The learning algorithm can be for reinforcement learning. The learning model 1M includes an intermediate layer 133, which is located between the input layer 131 and the output layer 132, includes a group of nodes formed by one or more layers. As illustrated in FIG. 3, the intermediate layer 133 connected to the output layer 132 is a connected layer for aggregating the multiple nodes into the number of nodes in the output layer 132. Three nodes are found in the output layer 132 in the example in FIG. 3, though one node can be possible. The number of nodes in the output layer 132 can take the number depending on the number of types of the control data of the component to be controlled. The nodes of the intermediate layer 133 each have a parameter including at least one of the weight and the bias in association with the node in the previous layer. The processor 10 labels input information with actual control data corresponding to the input information based on the control program 1P to thereby create training data. The processor 10 inputs the created training data to the input layer 131, so that the parameters in the intermediate layer 133 are each trained.

With reference to FIG. 3, the learning model 1M will specifically be described. In the illustrated example, the learning model 1M from which output information concerning control of a gear stage or a gear ratio for the transmission E is output will be described. As illustrated in FIG. 3, information concerning a traveling speed obtained from the speed sensor S1 is input to the input layer 131. The traveling speed is speed per hour, for example. The traveling speed can be the number of rotations of the front wheel A3 or the rear wheel A4 per unit time. A cadence obtained from the cadence sensor S2 is input to the input layer 131. At least one of the traveling speed and the cadence is input to the input layer 131. A torque obtained from the torque sensor S3 can be input to the input layer 131. Power obtained by computation using the torque and the cadence can be input to the input layer 131.

Detection data of the attitude of the human-powered vehicle A obtained from the gyro sensor S4 is input to the input layer 131. The detection data is information indicating the inclination of the human-powered vehicle A. The inclination is represented by a yaw component having an axis in the vertical direction, a roll component having an axis in the forward and backward direction of the human-powered vehicle A and a pitch component having an axis in the right and left direction of the human-powered vehicle A.

A video signal obtained from the image sensor S5 is input to the input layer 131. The video signal obtained from the image sensor S5 is a video signal corresponding to the user's field of vision, that is, data obtained by detecting a traveling environment. In the first example, the video signal to be input is each of the successive multiple frame images. In the second example, the video signal to be input is multiple pieces of data obtained by performing various filter processing on a frame image. In the third example, the video signal to be input is information indicating the kind of an object present in the direction of travel recognized by the image recognition part based on the video from the image sensor S5. The distance from the object present in the direction of travel can be included. The distance can be a distance obtained according to the image processing by the image recognition part or data obtained by a radar that had been mounted on the human-powered vehicle A.

Another example of the detection data for a traveling environment is time data, weather data, luminance intensity data or humidity data. The time data is, for example, time measured by an internal timer of the processor 10. The weather data is, for example, at least one of localized rainfall amounts, humidity, the velocity of wind and the direction of wind in the place where the human-powered vehicle A is traveling that can be obtained from an external server handling weather data. The humidity data can be acquired from a humidity sensor mounted on the main body A1 of the human-powered vehicle A. The luminance intensity data can be obtained by provision of a luminance intensity sensor at any position of the main body Al of the human-powered vehicle A, for example, at the handlebar A2.

Detection data of the user's posture obtained from each of the posture sensors S61, S62 and S63 is input to the input layer 131. The detection data is weight distribution data, for example. The posture sensors S61, S62 and S63 in the present embodiment are piezoelectric sensors. In the first example, signals output from the posture sensors S61, S62 and S63 are input to the input layer 131. In the second example, the processor 10 determines whether the rider is in a basic posture, a forwardly-tilted posture or is standing on pedals, and inputs the discrimination result to the input layer 131.

A vibration obtained from the vibration sensor S7 or a tension of the chain B4 obtained from the tension sensor S8 can be input to the input layer 131.

All the pieces of information that can be input from the sensor groups S1-S5, S61-S63, S7 and S8 do not need to be input to the input layer 131. Any one or a combination of multiple pieces of information that can be input from the sensor groups S1-S5, S61-S63, S7 and S8 can be input to the input layer 131. As indicated by dotted lines in FIG. 3, the input information can be divided into groups, and for each group, the input information can be input to a different NN 13. In such a case, output information concerning control is output for each group.

The output layer 132 outputs a result of discrimination among gear stages or among gear ratios for the transmission E. More specifically, the output layer 132 outputs probabilities respectively corresponding to the nodes of the gear stage and the gear ratio. This allows the processor 10 to select the gear stage with the highest probability.

The processor 10 uses the learning algorithm to create the deep learning a learning model 1M that sets input information concerning traveling of the human-powered vehicle A as an input to the input layer 131 and outputs output information concerning control of a component such as the transmission E of the human-powered vehicle A based on average riding or simulation. The created learning model 1M is stored in the storage 12. The learning model 1M stored in the storage 12 is updated according to the following processing based on training data including an evaluation of the output information, input information corresponding to the output of output information and the output information while the user performs actual riding operation of the human-powered vehicle A.

Figure 4:
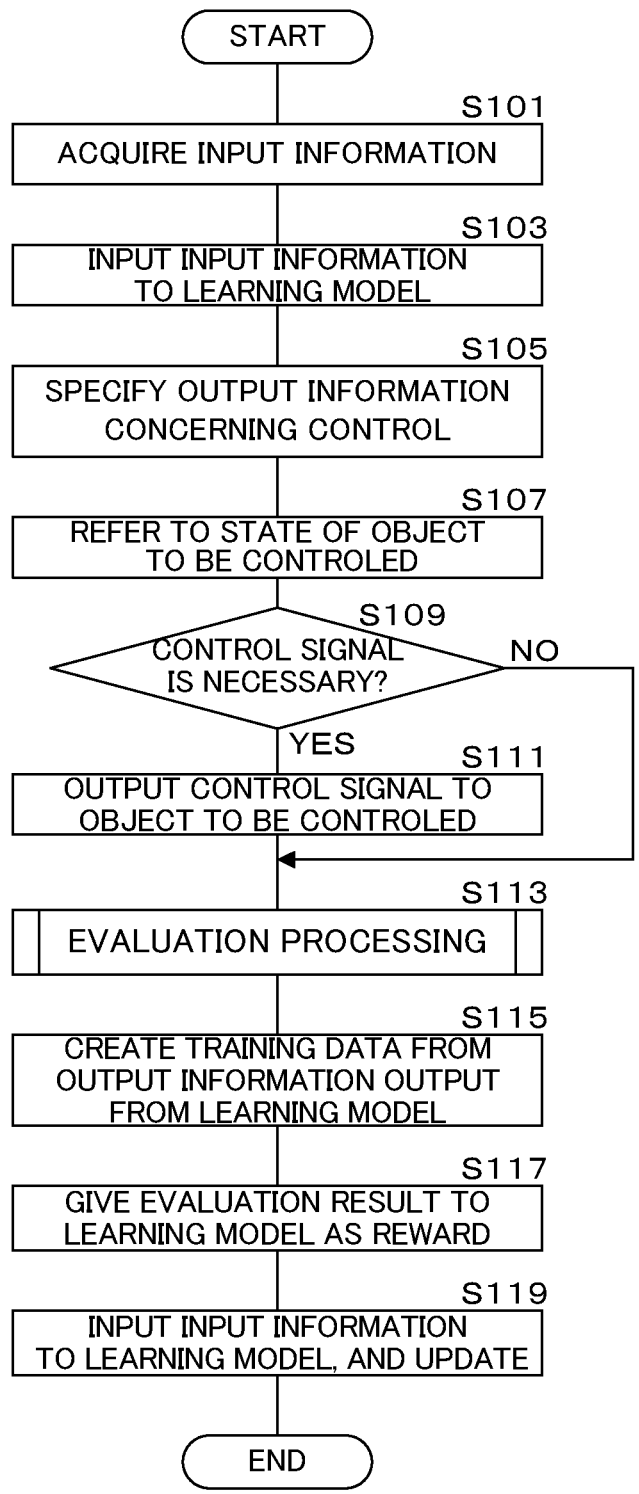
FIG. 4 is a flowchart depicting one example of a processing procedure performed by a processor.

FIG. 4 is a flowchart depicting one example of a processing procedure performed by the processor 10. The processor 10 repeatedly executes the processing procedure illustrated in the flowchart in FIG. 4. The processor 10 repeatedly executes the processing procedure for each predetermined control period (30 milliseconds, for example).

The processor 10 acquires input information concerning traveling of the human-powered vehicle A through the input-output interface 14 (step S101). The processor 10 corresponds to an "acquisition part" at step S101. At step S101, the control part of the processor 10 refers to signal levels from the sensor groups S1-S5 and S61-S63 input through the input-output interface 14 every control period, and temporarily stores them in the internal memory of the processor 10 or the memory integrated in the input-output interface 14.

The processor 10 inputs the input information acquired at step S101 to the input layer 131 of the learning model 1M (step S103).

The processor 10 specifies the output information concerning control of the component to be controlled that is to be output from the learning model 1M in response to the input of the input information input at step 103 (step S105). The processor 10 specifies a result of discrimination among gear stages or among gear ratios for the transmission E, for example, as output information at step S105.

A control part of the processor 10 refers to the state of the object to be controlled based on the specified output information (step S107). The processor 10 determines whether or not an output of a control signal is necessary based on the relation between the details of control indicated by the specified output information and the state that has been referred to (step S109).

If determining that an output of a control signal is necessary at step S109 (S109: YES), the processor 10 outputs a control signal based on the specified output information concerning control to the object to be controlled (step S111). If determining that an output of a control signal is not necessary at step S109 (S109: NO), the processor 10 proceeds to the next processing without executing the processing at step S111. The reference processing at step S107 and the determination processing at step S109 are not necessarily made. In this case, the processor 10 can specify the result of a discrimination among gear stages or among gear ratios for the transmission E as output information at step S105, and output a control signal based on the specified output information concerning control without referring to the state of the object to be controlled based on the specified output information (S111).

The processor 10 evaluates the output information output from the learning model specified at step S105 within a predetermined time after the processing at step S111 (step S113). At step S113, the processor 10 is an "evaluation part." The processor 10 makes an evaluation based on whether or not the control of the component, for example, the control of the transmission E using the output information output from the learning model 1M has been performed in a predetermined manner (e.g., the control of the component is smoothly performed) at step S113. The evaluation processing at step S113 will be described later.

The processor 10 labels the input information acquired at step S101 with the output information output from the learning model 1M at step S105 to thereby create training data (step S115). The processor 10 gives the evaluation result obtained at step S113 to the learning model 1M as a reward (step S117), gives the training data created at step S115 to the learning model 1M together with the reward to thereby update the learning model 1M (step S119) and ends the processing. At step S117, the processor 20 can assign a larger weight as the degree of evaluation is higher or lower. For example, the processor 20 assign an index value indicating a reward with a larger weight as the evaluation is higher. Moreover, the processor 20 assigns an index value indicating a penalty with a larger weight as the evaluation is lower. The processor 20 can assign only the index value indicating a reward or assign only the index value indicating a penalty.

Figure 5:
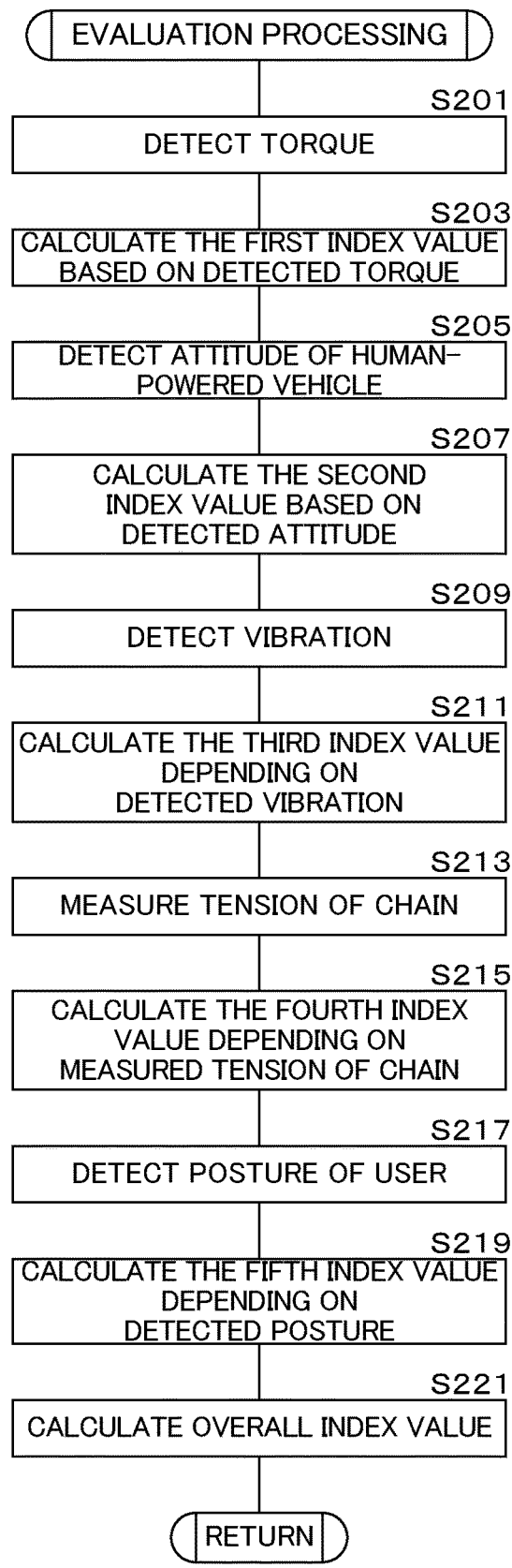
FIG. 5 is a flowchart depicting one example of an evaluation processing procedure performed by the processor of the controller.

FIG. 5 is a flowchart depicting one example of an evaluation processing procedure performed by the processor 10. The processor 10 detects a torque applied to the driving mechanism B by the torque sensor S3 through the input-output interface 14 when control of a component including the transmission E of the human-powered vehicle A is performed (step S201). The processor 10 calculates a first index value (Q value in the Q learning, for example) corresponding to a reward based on the detected torque (step S203). At step S203, the processor 10 determines whether or not a component control has been performed in the predetermined manner (e.g., the control of the component is smoothly performed) depending on the torque and makes an evaluation based on the determination. If the torque is significantly high, it is assumed that the user rides the bicycle with a force as a result of the control. In this case, the processor 10 can determine that the control based on the output information has not been performed in the predetermined manner (e.g., the control of the component is smoothly performed). The processor 10 determines that the control has been smoothly performed as the torque is lower, and calculates the evaluation of the reward to be increased.

At step S203, for example, the processor 10 can apply a minus sign to the magnitude of the torque, add a predetermined value to the resultant, and calculate the first index value such that the first index value takes a positive value if the detected torque is equal to or less than a predetermined value. The processor 10 can calculate the first index value such that a negative value whose absolute value is larger can be set as an index value (penalty value) as the torque is higher. At step S203 in another example, the processor 10 detects a torque applied to the driving mechanism B at different points in time at step S201, determines whether or not the control based on the output information has been performed in the predetermined manner (e.g., the control of the component is smoothly performed) according to the variation of the torque and calculates the first index value based on the determination. In this example, since the processor 10 can determine that the control has been smoothly performed as the variation of the torque is lower, the processor 10 calculates the first index value indicating a reward with a high evaluation.

The processor 10 detects an attitude of the human-powered vehicle A obtained from the gyro sensor S4 when control of a component is performed (step S205) and calculates a second index value depending on the detected attitude (step S207). As a result of the control, it is assumed by the degree of inclination that the human-powered vehicle A is inclined. If the inclination is large, the processor 10 can determine that the control based on the output information has not been performed in the predetermined manner (e.g., the control of the component is smoothly performed). Accordingly, the processor 10 determines that the control has been smoothly performed as the inclination is smaller in all the rotational directions of yaw, roll and pitch, and calculates the second index value indicating a reward with a high evaluation.

At step S207, the processor 10 can apply a minus sign to the absolute of the inclination in each of the directions indicating the attitude and calculate the second index value such that the second index value takes a positive value if the inclination is within a predetermined angle. The processor 10 can calculate the second index value such that a negative value whose absolute value is larger can be given as an index value (penalty value) as the attitude is more largely inclined. At step S207 in another example, the processor 10 can detect an attitude at different points in time from the gyro sensor S4 at step S205 and can calculate the second index value based on the variation of the attitude. In this example, since the processor 10 can determine that the control based on the output information has been performed in the predetermined manner as the variation in attitude is smaller, the processor 10 calculates the second index value indicating a reward with a high evaluation.

The processor 10 detects a vibration of the human-powered vehicle A obtained from the vibration sensor S7 when control of a component is performed (step S209) and calculates a third index value corresponding to a reward depending on the detected vibration (step S211). As the vibration is stronger or as the number of vibrations is larger, the controller 10 can determine that the control of the human-powered vehicle A has not been performed in the predetermined manner. The processor 10 determines that the control has been performed in the predetermined manner (e.g., the control of the component is smoothly performed) as the vibration is weaker and calculates the third index value indicating a reward with a high evaluation.

At step S209, the processor 10 acquires, for example, the waveform of the vibration obtained from the vibration sensor S7 through the input-output interface 14. The processor 10 can extract noise from the waveform of the vibration, apply a minus sign to the magnitude of the noise, add a predetermined value to the resultant and calculate the third index value such that the reward takes a positive value in the case where the added value is equal to or less than a predetermined noise level. The processor 10 calculates an index value by a predetermined function if the added value is equal to or less than the predetermined noise level, and makes the function steep such that a high reward is provided as the noise is smaller.

The processor 10 measures the tension of the chain B4 of the human-powered vehicle A based on a signal obtained from the tension sensor S8 when a component control is performed (step S213). The processor 10 calculates a fourth index value corresponding to the reward depending on the measured tension (step S215). If the tension is within a predetermined range, the processor 10 determines that the control based on the output information has been performed in the predetermined manner (e.g., the control of the component is smoothly performed) and calculates the fourth index value indicating a reward with a high evaluation.

The processor 10 can calculate a tension at different points in time at step S213, and can calculate the fourth index value based on the variation of the tension at step S215.

The processor 10 detects the posture of the user of the human-powered vehicle A when control of a component is performed based on a signal obtained from the posture sensors S61-S63 (step S217) and calculates a fifth index value corresponding to the reward depending on the detected posture of the user (step S219). At step S217, the processor 10 can detect the sway of the posture of the user based on the variation between different points in time. The processor 10 can determine that the control of the human-powered vehicle A has not been performed in the predetermined manner (e.g., the control of the component is smoothly performed) as the posture of the user is more largely inclined or as the degree of sway of the posture is larger. The processor 10 determines that the control has been performed in the predetermined manner (e.g., the control of the component is smoothly performed) as the inclination of the posture of the user is smaller or as the degree of sway is smaller, and calculates the fifth index value indicating a reward with a high evaluation.

The processor 10 calculates an overall index value based on the calculated first to fifth index values (step S221). At step S221, the processor 10 can calculate the overall index value by summing the first to fifth index values, or by assigning weights to the first to fifth index values and summing the weighted first to fifth index values, for example. The processor 10 can calculate the overall index value by multiplying the first to fifth index values or using a predetermined evaluation function. The processor 10 returns the processing to step S115 of the flowchart in FIG. 4 regarding the overall index value obtained at step S221 as an evaluation result.

The processing procedure of the flowchart in FIG. 5 is strictly illustrative. The processor 10 can calculate an index value from any one of the torque sensor S3, the gyro sensor S4, the vibration sensor S7, the tension sensor S8 and the posture sensors S61-S63. That is, the processing at step S115 of the flowchart in FIG. 4 can be executed using any one of the first to fifth index values. The processing at step S115 can be executed by any two or three of the first to fifth index values.

As another example of calculation of the first to fifth index values in the flowchart of FIG. 5, whether or not each of the detected physical values is equal to or larger than a predetermined value is determined, and each of the first to fifth index values can be calculated to be a low evaluation if the detected physical value is equal to or larger than a predetermined value.

Hence, by the evaluation for the control based on the output information output from the learning model 1M, the learning model 1M is updated, so that the learning model 1M that outputs control data suited to the user's way of riding is created.

Second Embodiment

Figure 6:
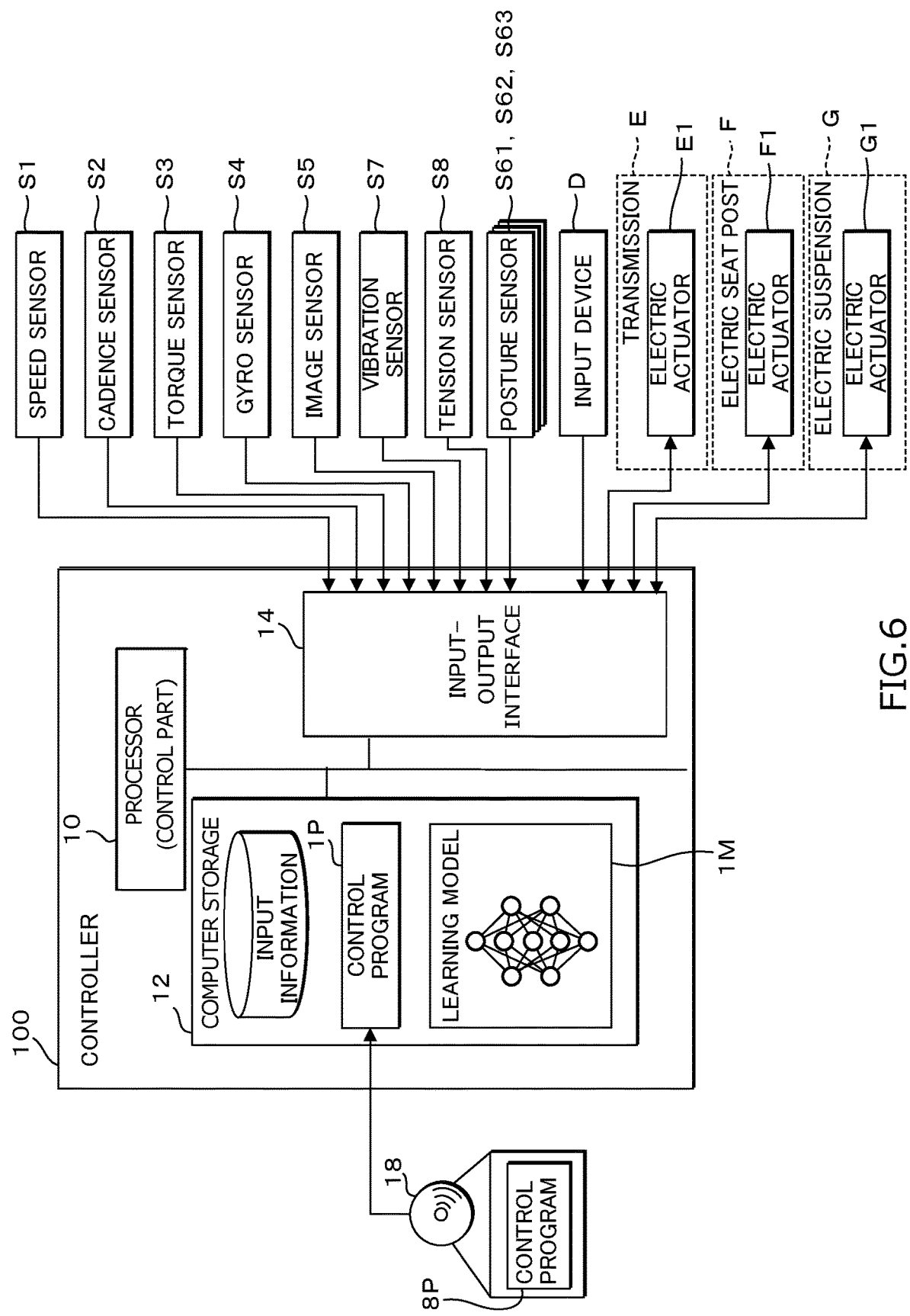
FIG. 6 is a block diagram illustrating a bicycle component control system and schematically illustrating an internal configuration of a controller in conjunction with a plurality of sensors, a user operable input device and a plurality of bicycle components according to a second embodiment.

FIG. 6 is a block diagram illustrating the internal configuration of a controller 100 according to a second embodiment. The human-powered vehicle A and the controller 100 in the second embodiment are similar in configuration to those in the first embodiment except for a storage and the details of processing that are to be described later, and the common components will be denoted by the same reference codes and detailed description thereof will not be repeated. In the second embodiment, the storage 12 of the controller 100 temporarily stores, one by one, multiple pieces of input information acquired in time series in different points in time. The storage 12 specifically stores input information input through the input-output interface 14 from the sensor groups S1-S5, S61-S63, S7 and S8 mounted on the human-powered vehicle A together with time information by multiple sampling periods. The storage 12 cyclically stores the input information utilizing storage areas of the multiple sampling periods so that the old input information is automatically overwritten.

Figure 7:
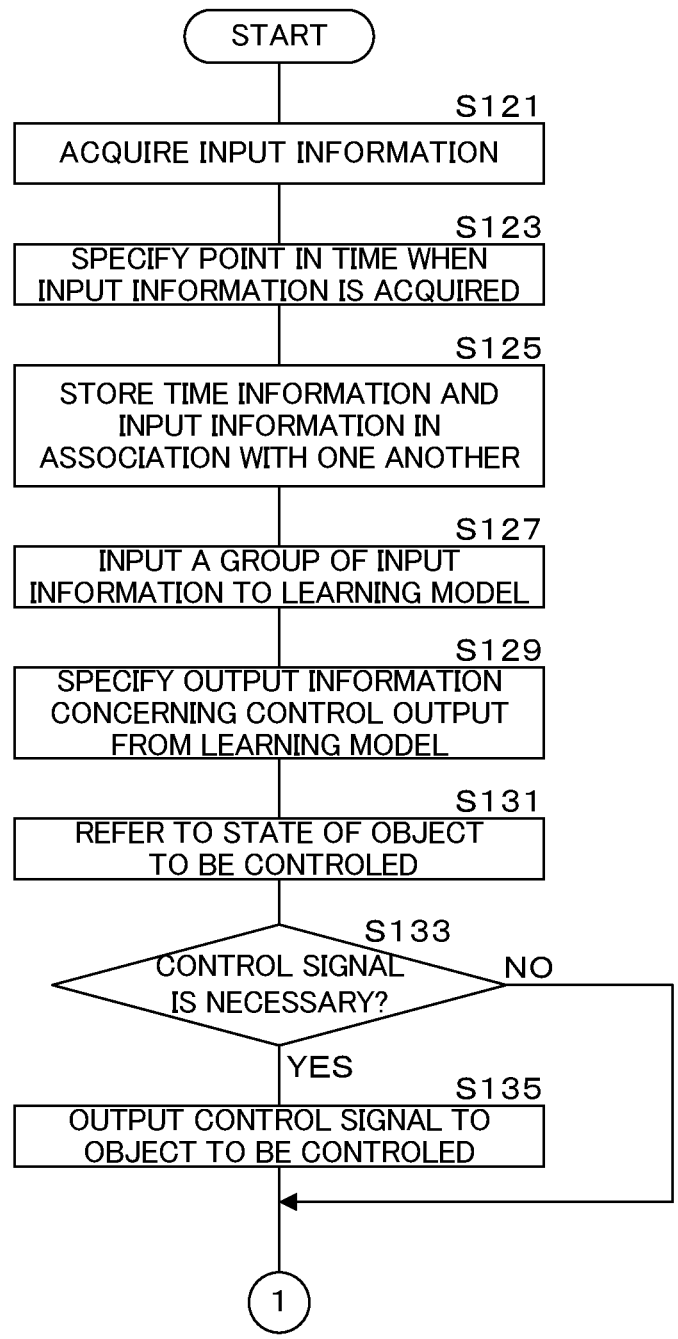
FIG. 7 is a first flowchart part depicting one example of a processing procedure performed by the controller according to the second embodiment.
Figure 8:
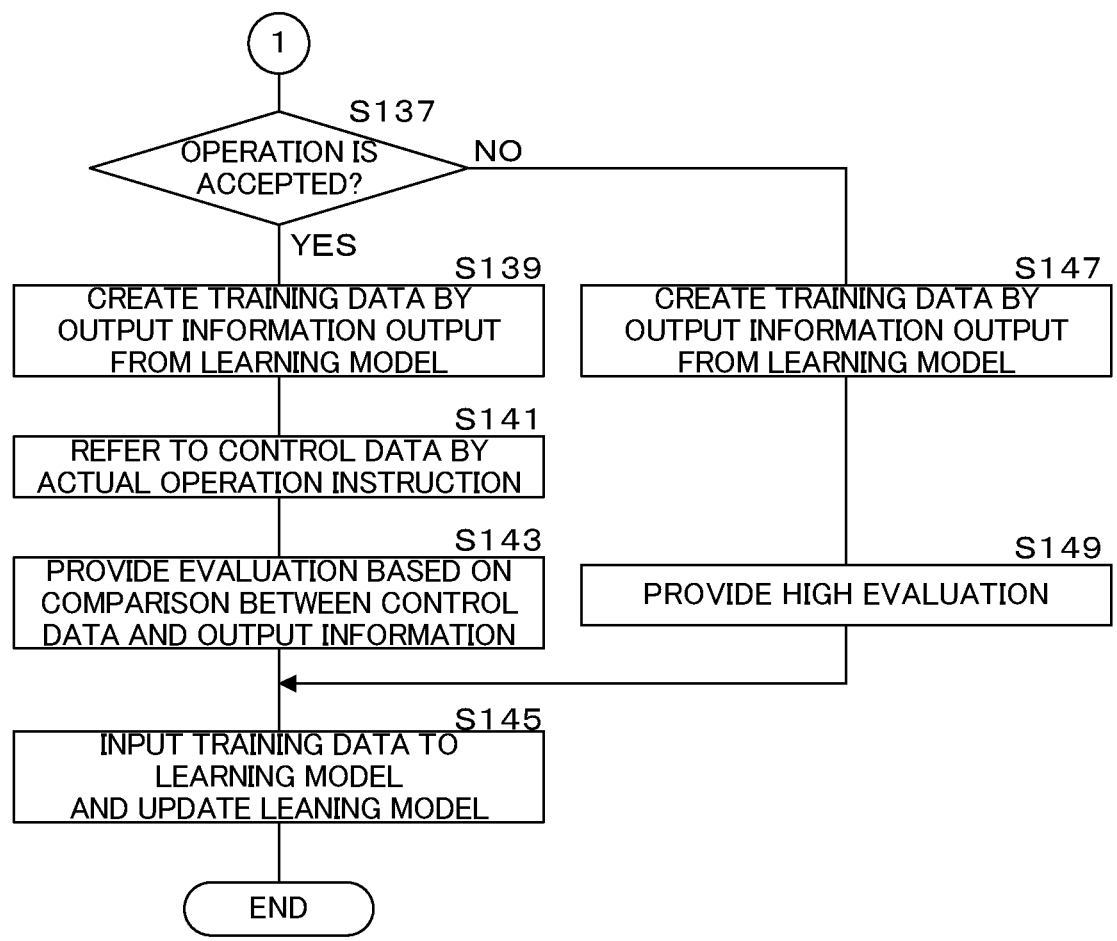
FIG. 8 is a second flowchart part depicting the example of the processing procedure performed by the controller according to the second embodiment.

FIG. 7 and FIG. 8 each are a flowchart depicting one example of the processing procedure performed by the controller 100 according to the second embodiment. Since the controller 100 in the second embodiment is similar in configuration to that in the first embodiment except for the details of evaluation processing that will be described later, corresponding parts are denoted by the same reference codes and detailed description thereof will not be repeated. The processor 10 of the controller 100 repeatedly executes the following processing procedure.

The processor 10 acquires input information concerning traveling of the human-powered vehicle A through the input-output interface 14 (step S121). At step S121, the processor 10 is an "acquisition part." At step S121, the control part of the processor 10 refers to signal levels from the sensor groups S1-S5 and S61-S63 input through the input-output interface 14 every control period, and temporarily stores them in the internal memory of the processor 10 or the memory integrated in the input-output interface 14.

The processor 10 specifies the point in time when the input information is acquired at step S121 (step S123). At step S123, the processor 10 can employ timing information acquired from the internal timer as an acquisition point in time or time information.

The processor 10 stores in the storage 12 the time information indicating the acquisition point in time specified at step S123 and the input information acquired at step S121 in association with each other (step S125).

The processor 10 inputs the input information acquired at step S121 or multiple pieces of input information until the acquisition point in time specified at step S121 that are stored in the storage 12 to the input layer 131 of the learning model 1M (step S127).

The processor 10 specifies output information concerning control of the component to be controlled that is to be output from the learning model 1M (step S129). The processor 10 specifies a result of discrimination among gear stages or among gear ratios for the transmission E, for example, as output information at step S129.

The control part of the processor 10 refers to the state of the object to be controlled based on the specified output information (step S131). The processor 10 determines whether or not an output of a control signal is necessary based on the relation between the details of the control indicated by the specified output information and the state that has been referred to (step S133).

If determining that an output of a control signal is necessary at step S133 (S133: YES), then the processor 10 outputs a control signal based on the specified output information concerning control to the object to be controlled (step S135). If determining that an output of a control signal is not necessary at step S133 (S133: NO), then the processor 10 advances the processing to the next processing by skipping the processing at step S135. In this case, the processor 10 can specify the result of a discrimination among gear stages or among gear ratios for the transmission E as output information at step S129, and can output to the object to be controlled a control signal based on the specified output information concerning control without referring to the state of the object to be controlled based on the specified output information (S135).

The processor 10 determines whether or not an operation instruction to the component to be controlled is accepted through the user operated part D1 of the user operable input device D within a predetermined time (step S137).

If it is determined that an operation instruction is accepted (S137: YES), then the processor 10 labels the multiple pieces of input information input at step 5127 with the output information output from the learning model 1M at step S129 to thereby create training data (step S139). At step S139, the processor 10 selects the input information corresponding to the timing when the operation instruction is provided from the storage 12 to create the training data.

The control part of the processor 10 refers to control data by the actual operation instruction (step S141) and provides an evaluation based on the comparison between the control data and the output information output from the learning model 1M specified at step S129 (step S143). The step S143 corresponds to an "evaluation part." At step S143, the control part of the processor 10 provides a lower evaluation as the difference between the control data by the operation instruction referred to at step S139 and the output information concerning control output from the learning model 1M obtained at step S129 is larger.

The control part of the processor 10 gives the training data created at step S139 to the learning model 1M together with a penalty including the evaluation provided at step S143 to update the same (step S145), and ends the processing.

If it is determined that an operation instruction is not accepted at step S137 (step S137:NO), then the control part of the processor 10 labels the input information input at step S127 with the output information concerning control output from the learning model 1M at step S129 to thereby create training data (step S147).

The control part of the processor 10 provides the created training data with a high evaluation (step S149), gives the training data to the learning model 1M to update the same (step S145), and ends the processing. The processing at step S147 corresponds to the "evaluation part."

In addition to the processing at steps S137-S143, the processor 10 can update the learning model 1M based on the training data created by being labeled with the details of the actual operation instruction. In this case, if determining that a designation operation is accepted by the user operated part D1 at step S137, the processor 10 updates the learning model 1M by the multiple pieces of input information acquired before and after the timing when the designation operation is performed and stored in the storage 12 as well as the details of the operation through the user operable input device D. In this case, the processor 10 provides the training data created by labeling the input data with the details of the actual operation with a high evaluation and gives the training data to the learning model 1M to thereby update the learning model 1M. In the first example, the designation detail by the user operated part D1 is at least one of a gear stage and a gear ratio for the transmission E. In the second example, the designation detail is a supported position for the electric seat post F. In the third example, the designation detail is setting information such as a damping factor, a stroke amount and a locked out state of the electric suspension G.

In the second embodiment, in place of the multiple pieces of input information being input at step S127, a variation of the multiple pieces of input information can be input. The processor 10 can calculate a variation before and after every sampling period and then give a variation value to the input layer 131 or give a trend of the variation (increase, decrease, maintenance) to the input layer 131, or can calculate a waveform corresponding to a time series distribution as a variation and then give it to the input layer 131. The variation value can include one or multiple times of time differential values.

Third Embodiment

Figure 9:
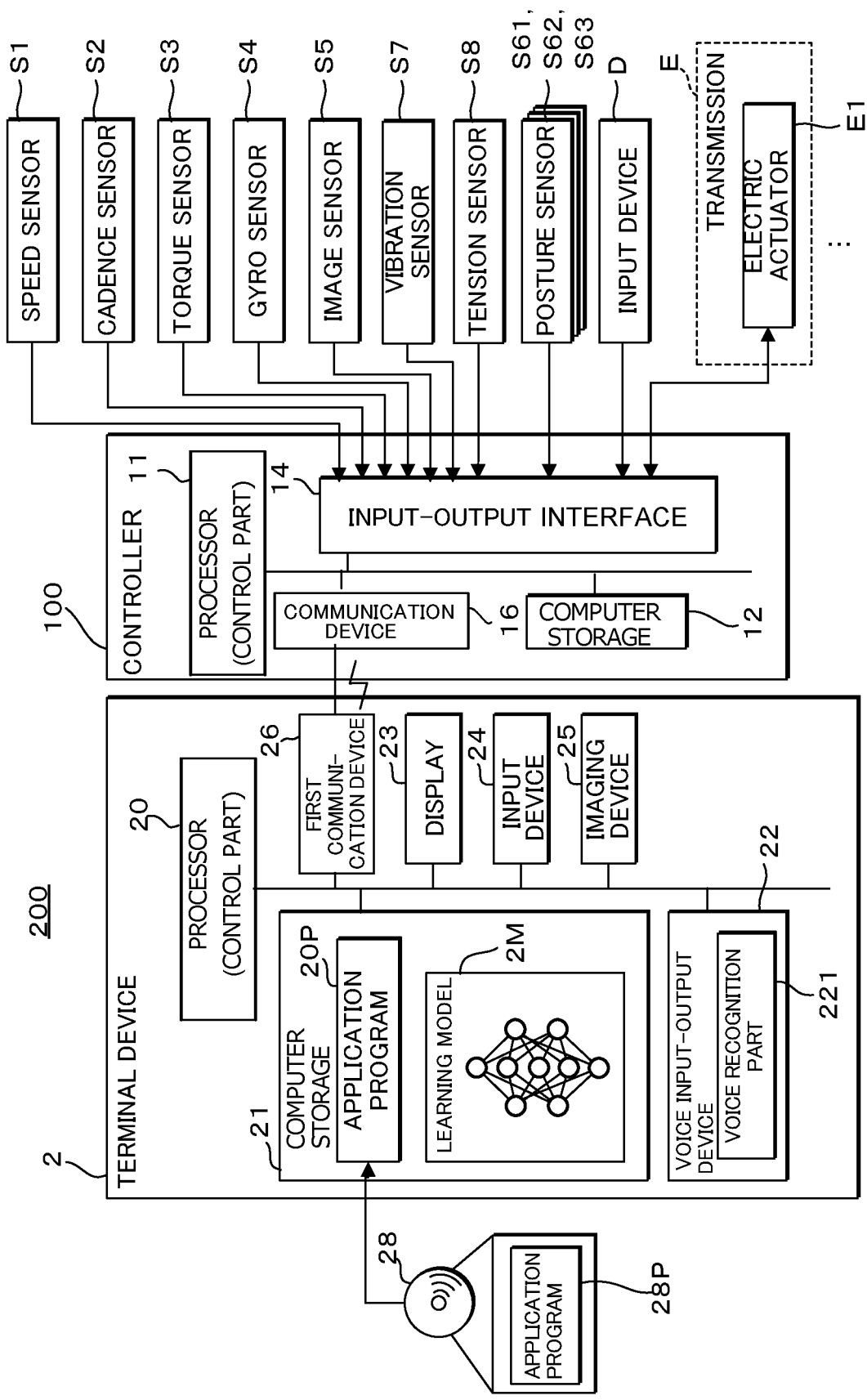
FIG. 9 is a block diagram schematically illustrating the configuration of a bicycle component control system including a terminal device, the controller, a plurality of sensors, a user operable input device and a plurality of bicycle components.

In a third embodiment, the learning model creation processing and the component control processing are executed by a terminal device of the user in place of the controller 100. FIG. 9 is a block diagram illustrating the configuration of a control system 200. The control system 200 includes a terminal device 2 and a controller 100. The controller 100 in the third embodiment includes a processor 11, a storage 12, an input-output interface 14 and a communication device 16. Some of the components of the controller 100 in the third embodiment common to those of the controller 100 in the first and second embodiments will be denoted by the same reference codes and detailed description thereof will not be repeated.

The processor 11 of the controller 100 in the third embodiment, which is a computer processor utilizing a CPU, executes processing by controlling each of the components with the use of a memory such as a built-in ROM, RAM and so on. The processor 11 does not execute the training processing performed by the processor 10 of the controller in the first embodiment. The processor 11 receives inputs from the sensor groups S1-S5 and S61-S63 mounted on the human-powered vehicle A through the input-output interface 14, and transmits the inputs to the terminal device 2 via the communication device 16. The control part of the processor 11 refers to a control state of the user operable input device D and an operation signal output from the user operable input device D and transmits them to the terminal device 2 via the communication device 16. The processor 11 applies a control signal to the electric actuator El to be controlled based on the operation signal output from the user operable input device D or an instruction output from the terminal device 2.

A communication device is a hardware device capable of transmitting an analog or digital signal over a communication wire, or a wireless signal. One example of communication devices includes a powerline communication module, a USB communications interface, a NIC (network interface card), Wi-Fi devices, and access points. The communication device 16 is a communication port, and the processor 11 transmits and receives information to and from the terminal device 2 via the communication part 16. The communication device 16 is a universal serial bus (USB) port in the first example. The communication device 16 is a short range wireless communication module such as Bluetooth® in the second example. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth® communications or any other type of signal suitable for short range wireless communications as understood in the bicycle field.

The terminal device 2 is a portable compact communication terminal device to be used by the user. The terminal device 2 is a smartphone in the first example. The terminal device 2 is a wearable device such as a so-called smartwatch or the like in the second example. For the smartphone, a smartphone holding member can be attached to the handlebar A2 of the human-powered vehicle A, and the smartphone can be used while being put on the holding member (see FIG. 10).

The terminal device 2 includes a processor 20, a storage 21, a display 23, a user operable input device 24, an imaging device 25 and a communication device 26.

The processor 20 includes a computer processor such as a CPU, a GPU, and a memory and so on. The processor 20 can be constituted as a single hardware (SoC: System On a Chip) integrated with the processor, the memory, the storage 21 and the communication device 26. The processor 20 executes training of the output information concerning control of the human-powered vehicle A and component control based on the training according to an application program 20P stored in the storage 21.

The storage 21 includes a non-volatile memory such as a flash memory, for example. The storage 21 stores the application program 20P. The storage 21 stores a learning model 2M created and updated by the processing performed by the processor 20. The storage 21 stores data to which the processor 20 refers. The application program 20P can be obtained by reading out an application program 29P stored in a storage medium 29 and copying it in the storage 21.

The display 23 includes a display device such as a liquid crystal panel, an organic electroluminescence (EL) display, or the like. The user operable input device 24 is an interface for accepting operation by the user and includes a physical button and a display-integrated touch panel device. The user operable input device 24 can accept operation performed on the screen displayed by the display 23 via the physical button or the touch panel.

The voice input-output device 22 employs a speaker, a microphone and so on. The voice input-output device 22 is provided with a voice recognition part 221 and is able to accept operation by recognizing the details of operation from the input voice via the microphone.

The imaging device 25 outputs a video signal obtained by using an image sensor. The processor 20 can obtain an image photographed by an image sensor of the imaging device 25 at any timing.

The communication device 26 is a communication module that corresponds to the communication device 16 of the controller 100. In the first example, the communication device 26 is a USB communication port. In the second example, the communication device 26 is a short range wireless communication module.

In the third embodiment, the controller 100 continuously acquires input information obtained from the sensor groups S1-S5, S61-S63, S7 and S8 mounted on the human-powered vehicle A through the input-output interface 14, and transmits the input information to the terminal device 2 via the communication device 16.

The processor 20 of the terminal device 2 functions as a processor that automatically controls the components including the transmission E using the learning model 2M by the learning algorithm of the deep learning based on the application program 20P as well as functions as creation part that updates the learning model 2M. The terminal device 2 corresponds to a "control data creation device" and a "component control device."

The operation of the terminal device 2 is similar to the operation of the processor 10 in the controller 100 illustrated in the first embodiment or the second embodiment. In the third embodiment, the terminal device 2 corresponding to the "creation device" or the "component control device" accepts an evaluation by the user based on the information obtained by the user operable input device 24 or the imaging device 25 and updates the learning model 2M depending on the details of the evaluation.

Figure 10:
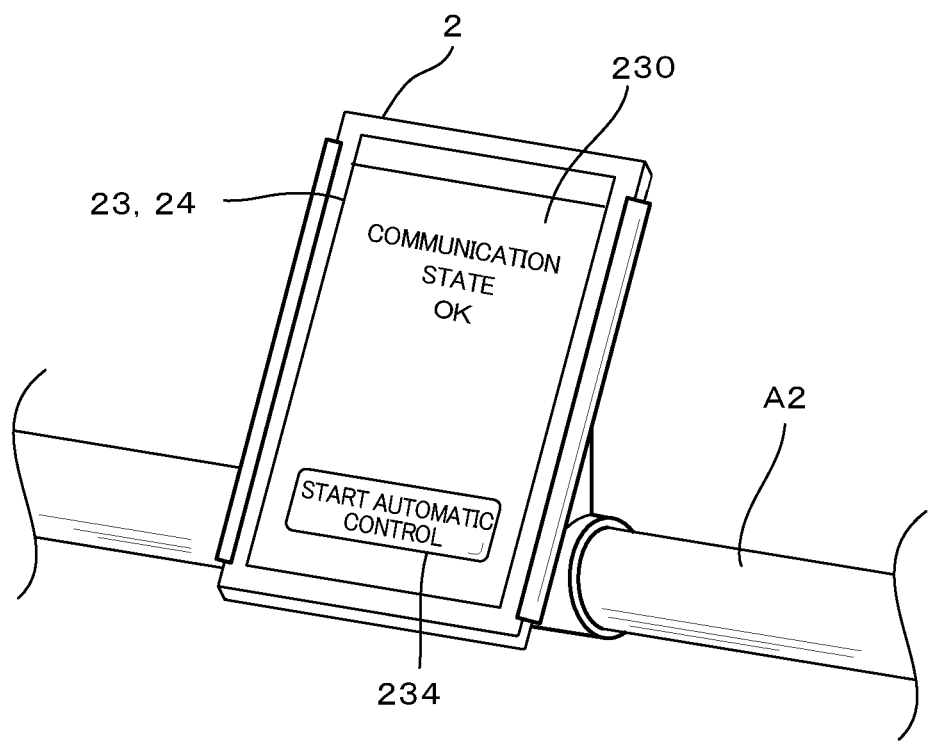
FIG. 10 is a perspective view of a portion of the bicycle having the terminal device displaying an example of a screen that is display based on an application program.
Figure 11:
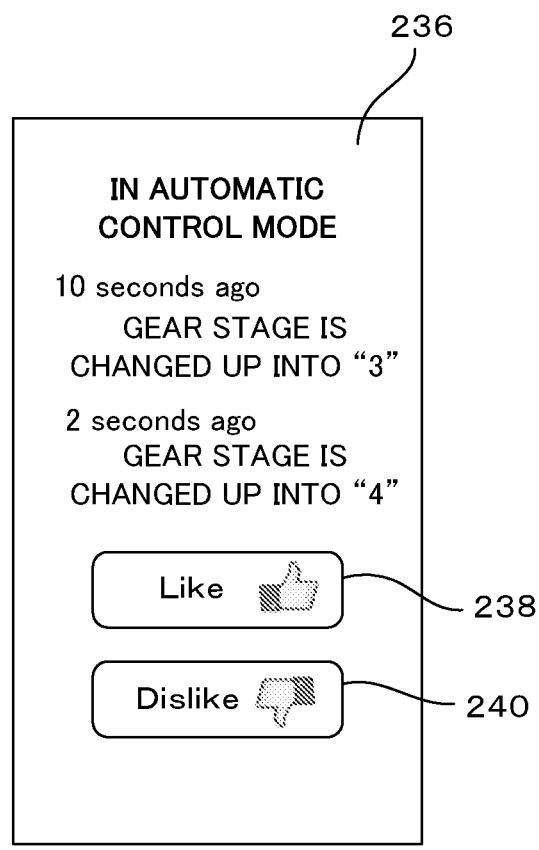
FIG. 11 is an elevational view of the screen of the terminal device showing an example of a screen that is displayed based on the application program.

FIG. 10 to FIG. 11 each illustrate an example of a screen displayed based on the application program 20P. In the example illustrated in FIG. 10, the terminal device 2 is a smartphone and attached to the handlebar A2 so as to allow the user to view the display device 23. FIG. 10 illustrates a main screen 230 displayed on the display device 23 based on the application program 20P. The processor 20 causes the display device 23 to display the main screen 230 if execution of the application program 20P is selected. The processor 20 establishes communication with the controller 100 when execution of the application program 20P is started. The processor 20 can display a message indicating a communication state on the main screen 230 as illustrated in FIG. 10. On the main screen 230, a button 234 for accepting the start of the automatic control based on the learning model 2M is included. The processor 20 starts processing of updating the learning model 2M while performing automatic control based on the control data output from the learning model 2M if the selection button 234 is selected.

FIG. 11 is an example of the content of an automatic control mode screen 236 to be displayed if the button 234 for accepting the start of the automatic control is selected. For the automatic control mode screen 236, if determining that an output of a control signal to the transmission E is necessary and outputting a control signal, the processor 20 displays a message indicating that a gear stage or a gear ratio is changed or outputs the message by voice from the voice input-output device 22. The processor 20 accepts an evaluation of this message. The processor 20 accepts operation by the user for the details of the control performed by the processor 20 based on the output information output from the learning model 2M and accepts an evaluation of the details of the control by the details of the operation by any example described below. The processor 20 is an "evaluation acceptance part."

The first example of the "evaluation acceptance part" includes a high evaluation button 238 and a low evaluation button 240 for accepting an evaluation that are included in the automatic control mode screen 236 illustrated in FIG. 11. The processor 20 recognizes selection operation performed on the evaluation button 238 or 240 via the touch panel of the user operable input device 24 and accepts the evaluation. The high evaluation button 238 in the example illustrated in FIG. 11 is selected if automatic control of the gear stage or the gear ratio is comfortable. The low evaluation button 240 is selected if the automatic control is not comfortable. The processor 20 becomes aware of which one of the buttons 238 and 240 is selected and recognizes the accepted details of the evaluation. As a modification of the first example of the "evaluation acceptance part," only the low evaluation button 240 can be displayed. As a modification of the first example of the "evaluation acceptance part," a button for making such an evaluation that the shifted gear stage or gear ratio is too heavy (too OUTWARD) and a button for making such an evaluation that it is too light (too INWARD) can be included.

The second example of the "evaluation acceptance part" can be a physical button provided on the user operated part D1. A specific evaluation acceptance button can be provided on the user operated part D1. An evaluation acceptance button can separately be provided close to the user operable input device D. The processor 20 can recognize the details of the evaluation based on whether or not the specific evaluation acceptance button is pressed as well as the way of pressing a general-purpose button and a combination with a lever operation. The third example of the "evaluation acceptance part" is a voice recognition part 221 of the voice input-output device 22. The processor 20 determines whether or not automatic control is comfortable based on the voice of the user recognized by the voice recognition part 221. The fourth example of the "evaluation acceptance part" is the imaging device 25. The processor 20 specifies facial expressions of the user based on a photographed image obtained by photographing the face of the user by the imaging device 25, determines whether or not automatic control is comfortable and accepts the determination result as an evaluation.

Figure 12:
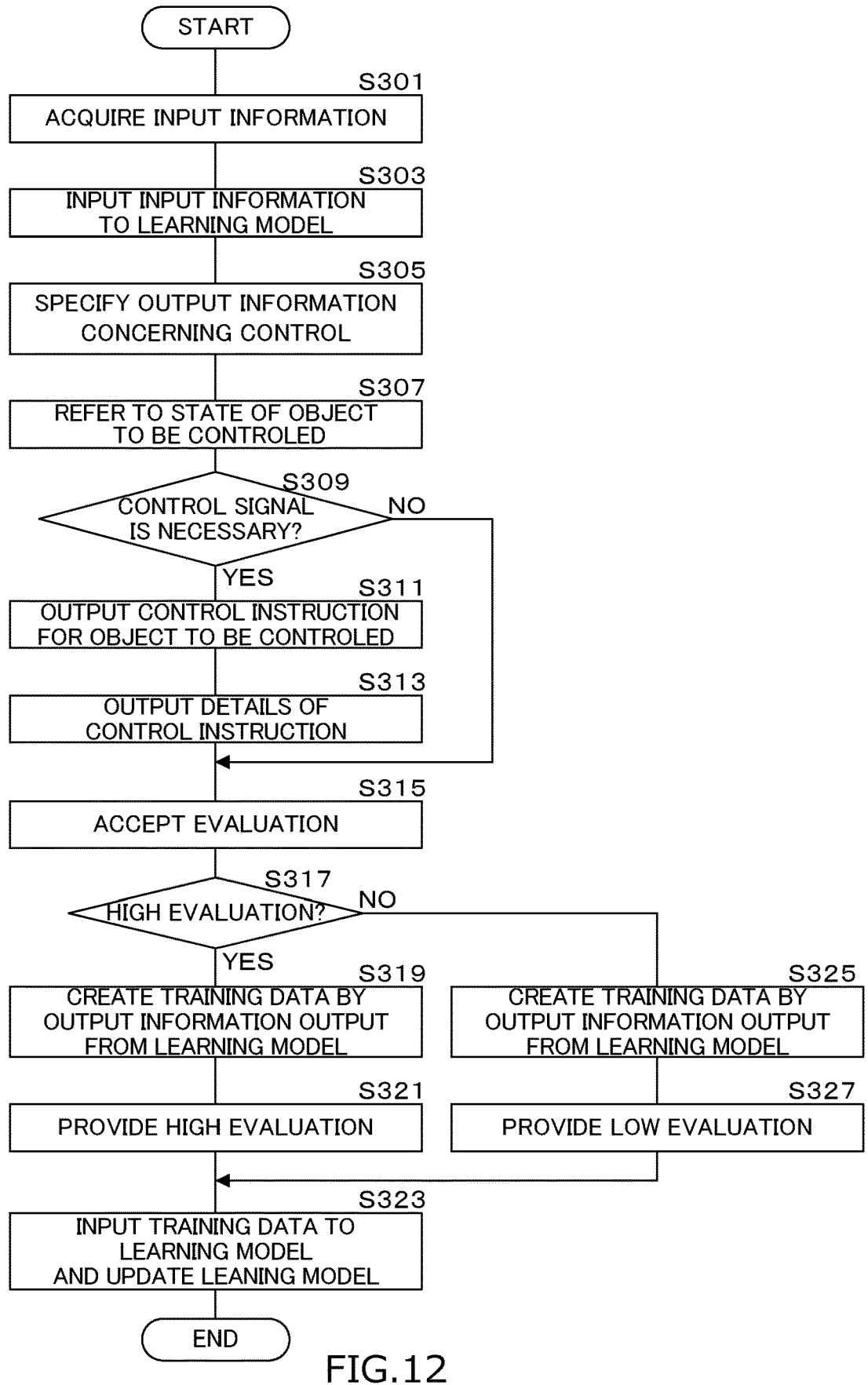
FIG. 12 is a flowchart depicting one example of a processing procedure performed by a processor according to a third embodiment.

FIG. 12 is a flowchart depicting one example of the processing procedure performed by the processor 20 in the third embodiment. The processor 20 repeatedly executes the following processing procedure. It can be executed at a predetermined control period (30 milliseconds, for example).

The processor 20 acquires input information concerning traveling of the human-powered vehicle A obtained from the controller 100 via the communication device 26 (step S301). At step S301, the processor 20 acquires signal levels obtained by the processor 10 of the controller 100 referring to the signal levels from the sensor groups S1-S5 and S61-S63 for every control period, and temporarily storing them in the internal memory of the processor 10 or the memory integrated in the input-output interface 14.

The processor 20 inputs the input information acquired at step S301 to the learning model 2M (step S303).

The processor 20 specifies output information concerning control of the component to be controlled that is to be output from the learning model 2M (step S305). The processor 20 specifies a result of discrimination among gear stages or among gear ratios for the transmission E, for example, at step S305.

The control part of the processor 20 refers to the state of the object to be controlled (step S307). The control part of the processor 20 can refer to the gear stage or the gear ratio fed back from the transmission E, for example, via the controller 100 at step S307. The processor 20 determines whether or not an output of a control signal is necessary based on the relation between the details of the control indicated by the output information specified at step S305 and the state referred to at step S307 (step S309). If determining that an output of a control signal is necessary at step 5309 (S309: YES), then the processor 20 outputs a control instruction to the controller 100 (step S311). The processor 20 outputs the details of the control instruction to the display 23 (step S313). If determining that an output of a control signal is not necessary at step S309 (S309: NO), then the processor 20 advances the processing to step S315.

The processor 20 accepts an evaluation within a predetermined time period after the processing at step S311 (step S315).

The processor 20 determines whether or not the accepted evaluation is a high evaluation (step S317). If determining that it is a high evaluation (S317: YES), the processor 20 labels the input information input at step 5303 with the control data output from the learning model 2M at step S305 to thereby create training data (step S319).

The processor 20 give a high evaluation to the created training data (step S321), gives the high evaluation to the learning model 1M as a reward to thereby update the learning model 1M (step S323), and ends the processing. The step S321 corresponds to an "evaluation part."

If determining that it is not a high evaluation (S317: NO), then the processor 20 labels the input information input at step 5303 with the control data output from the learning model 2M at step 5305 to thereby create training data (step S325).

The processor 20 provides the created training data with a low evaluation (step S327). At step S327, the processor 20 is the "evaluation part." The processor 20 gives the training data created at step S325 together with a penalty including the evaluation provided at step S327 to the learning model 1M to thereby update the same (S323), and ends the processing.

In the third embodiment, the terminal device 2 can temporarily store, one by one, input information in the storage 21 in time series similarly to the second embodiment. In this case, if accepting an evaluation at step S315, the processor 20 creates at steps S319 and S325 training data including multiple pieces of input information that are acquired and stored in the storage 21 before and after the timing when the evaluation is accepted, the details of the control for the object to be evaluated and the accepted evaluation. The processor 20 sets the multiple pieces of input information acquired before and after the timing when the evaluation is accepted by the evaluation acceptance part as an input and updates the learning model 2M based on the training data including the output information output from the learning model 2M and the evaluation accepted by the evaluation acceptance part.

In the first to third embodiments, as output information output from the learning model 1M or the learning model 2M, control data concerning control of the transmission E is mainly described. The component to be controlled of the human-powered vehicle A can be the electric seat post F or the electric suspension G in place of the transmission E. The components to be controlled of the human-powered vehicle A can be the transmission E, the electric seat post F and the electric suspension G or can be the electric seat post F and the electric suspension G.

What is claimed is:

1. A control data creation device comprising:
    a non-transitory computer readable storage having a learning algorithm stored in the non-transitory computer readable storage; and
    at least one processor operatively coupled to the non-transitory computer readable storage, the at least one processor configured to:
    acquire input information concerning traveling of a human-powered vehicle;
    use the learning algorithm to create a learning model that outputs output information concerning control of a component of the human-powered vehicle based on the input information acquired; and
    evaluate the output information output from the learning model,
    the processor being configured to update the learning model based on training data including: an evaluation of the output information, the input information corresponding to an output of the output information, and the output information, the output information including a result of a discrimination among gear stages or a discrimination among gear ratios for a transmission.

2. The control data creation device according to claim 1, wherein
    the processor is configured to: determine whether or not control of a component based on the output information output from the learning model is performed in a predetermined manner, and increase an evaluation upon determining that the control is performed in the predetermined manner.

3. The control data creation device according to claim 2, wherein
    the processor is configured to: detect a torque applied to a driving mechanism of the human-powered vehicle upon determining the control based on the output information is performed, and determine whether or not the control is performed in the predetermined manner depending on the torque.

4. The control data creation device according to claim 2, wherein
    the processor is configured to: detect a torque applied to a driving mechanism of the human-powered vehicle upon determining the control based on the output information is performed, and determine whether or not the control is performed in the predetermined manner depending on a variation of the torque.

5. The control data creation device according to claim 2, wherein
    the processor is configured to: detect an attitude of the human-powered vehicle upon determining the control based on the output information is performed, and determine whether or not the control is performed in the predetermined manner depending on the attitude of human-powered vehicle.

6. The control data creation device according to claim 2. wherein
    the processor is configured to: detect a vibration of the human-powered vehicle upon determining the control based on the output information is performed, and determine whether or not the control is performed in the predetermined manner depending on the vibration.

7. The control data creation device according to claim 2, wherein
the processor is configured to: measure a chain tension of the human-powered vehicle upon determining the control based on the output information is performed, and determine whether or not the control is smoothly performed in the predetermined manner depending on the chain tension.

8. The control data creation device according to claim 2, wherein
the processor is configured to: detect a posture of a user of the human-powered vehicle upon determining the control based on the output information is performed, and determine whether or not the control is smoothly performed in the predetermined manner depending on the posture of the user.

9. The control data creation device according to claim 1, wherein
the processor is configured to update the learning model by assigning a larger weight as a degree of evaluation of the output information is higher or lower.

10. The control data creation device according to claim 1, further comprising
a user operable input device configured to accept a designation operation concerning the output information, and
a non-transitory computer readable storage being configured to temporarily store, one by one, a plurality of pieces of input information in time series for access by the processor,
upon determining acceptance of the designation operation by the user operable input device, the processor being configured to: set the pieces of the input information acquired before and after the designation operation is performed as input data, and update the learning model by the input data and a detail of the operation performed by the user operable input device.

11. A component control device comprising:
a non-transitory computer readable storage having a learning algorithm stored in the non-transitory computer readable storage; and
at least one processor operatively coupled to the non-transitory computerreadable storage, the at least one processor configured to:
acquire input information concerning traveling of the human-powered vehicle,
use the learning algorithm to create a learning model created such that the input information concerning traveling of a human-powered vehicle is set as an input and output information concerning control of a component of the human-powered vehicle is to he output;
control the component based on the output information output to the learning model in response to an input of the input information acquired, the output information including a result of a discrimination among gear stages or a discrimination among gear ratios for a transmission; and
evaluate a detail of the control of the component,
the learning model being updated based on an evaluation of the detail of the control of the component, the input information corresponding to the evaluation, and the detail of the control of the component.

12. The component control device according to claim 11, wherein:
the processor is configured to accept the evaluation of the detail of control, and
upon acceptance of the evaluation, the learning model is updated based on training data including a plurality of pieces of the input information acquired before and after a timing when the evaluation is accepted, the detail of the control, and the evaluation accepted.

13. A control data creation method comprising:
acquiring input information concerning traveling of a human-powered vehicle;
creating a learning model using a learning algorithm such that the input information that was acquired is set as an input, and output information concerning control of a. component of the human-powered vehicle is to be output; and
evaluating the output information output from the learning model,
the learning model is updated based on training data including an evaluation of the output information, the input information corresponding to an output of the output information, and the output information, the output in including a result of a discrimination among gear stages or a discrimination among gear ratios for a transmission.

14. A component control method comprising:
acquiring input information concerning traveling of a human-powered vehicle;
specifying output information output in response to an input of the input information to a learning model that is created using a learning algorithm such that the input information that was acquired is set as an input and output information concerning control of a component of the human-powered vehicle is to be output;
controlling the component based on the output information that was specified, the output information including a result of a discrimination among gear stages or a discrimination among gear ratios for a transmission;
evaluating a detail of the control of the component; and
updating the learning model based on training data including an evaluation of the detail of the control of the component, the input information corresponding to the evaluation, and the detail of the control of the component.

* * * * *